US012633659B2

(12) United States Patent
Kitagawa et al.

(10) Patent No.: US 12,633,659 B2
(45) Date of Patent: May 19, 2026

(54) PHASED ARRAY ANTENNA

(71) Applicant: Sharp Display Technology Corporation, Kameyama City (JP)

(72) Inventors: Hideki Kitagawa, Kameyama City (JP); Yoshimasa Chikama, Kameyama City (JP); Masamitsu Yamanaka, Kameyama City (JP)

(73) Assignee: SHARP DISPLAY TECHNOLOGY CORPORATION, Kameyama City (JP)

( * ) Notice: Subject to any disclaimer, the term of this patent is extended or adjusted under 35 U.S.C. 154(b) by 240 days.

(21) Appl. No.: 18/742,072

(22) Filed: Jun. 13, 2024

(65) Prior Publication Data

US 2025/0015495 A1 Jan. 9, 2025

(30) Foreign Application Priority Data

Jul. 7, 2023 (JP) ................................ 2023-112630

(51) Int. Cl.
*H01Q 3/36* (2006.01)

(52) U.S. Cl.
CPC .................................... *H01Q 3/36* (2013.01)

(58) Field of Classification Search
CPC ...................................................... H01Q 3/36
See application file for complete search history.

(56) References Cited

U.S. PATENT DOCUMENTS

| | | | |
|---|---|---|---|
| 2017/0065178 | A1 | 3/2017 | Suzuki et al. |
| 2022/0037785 | A1 | 2/2022 | Okita |

FOREIGN PATENT DOCUMENTS

| | | | | |
|---|---|---|---|---|
| JP | 2000-138512 | A | 5/2000 | |
| JP | 2019-506205 | A | 3/2019 | |
| JP | 6642421 | B2 | 2/2020 | |
| JP | 2022-025914 | A | 2/2022 | |
| WO | 2017/115361 | A1 | 7/2017 | |
| WO | 2019/189151 | A1 | 10/2019 | |
| WO | WO-2021252036 | A1 * | 12/2021 | ............. H01Q 3/26 |

* cited by examiner

*Primary Examiner* — Henry Luong
(74) *Attorney, Agent, or Firm* — Keating & Bennett, LLP

(57) ABSTRACT

A phased array antenna with high yield and excellent transmission and reception performance is provided. The phased array antenna includes a printed circuit board 10 including a plurality of first terminals, a TFT substrate 50 including a plurality of second terminals and being arranged to face the printed circuit board 10, and a plurality of conductors 30 connecting the first terminals and the second terminals, respectively. The printed circuit board includes a plurality of transmission/reception electrodes 12, and beam-forming ICs 20 receiving control signals from the TFT substrate via the first terminals and adjusting phases of signals transmitted and received by transmission/reception electrodes according to the control signals. The TFT substrate includes a plurality of control circuits 80 that include TFTs and generate control signals for controlling the beam-forming ICs, and a planarization multilayer 70 that covers the plurality of control circuits, wherein a terrace **70*t*** is provided on a side face of the planarization multilayer.

20 Claims, 28 Drawing Sheets

PHASED ARRAY ANTENNA

BACKGROUND

1. Field

The present disclosure relates to a phased array antenna.

2. Description of the Related Art

Microwaves in the range of about 1 GHz to about 30 GHz are used in wireless communications such as wireless LAN, mobile phone communication networks, and satellite communications, because they can propagate a large amount of information. Since such high-frequency radio waves propagate with high directionality, beamforming technology is sometimes used to transmit and receive radio waves.

For example, Japanese Patent Publication No. 2022-25914 discloses a phased array antenna that uses a liquid crystal layer for phase control.

SUMMARY

It is an object of the present disclosure to provide a phased array antenna with high yield and excellent transmission and reception performance.

A phased array antenna according to one embodiment of the present disclosure is a phased array antenna that includes: a printed circuit board including a plurality of first terminals; a TFT substrate including a plurality of second terminals and a plurality of third terminals, the TFT substrate being arranged relative to the printed circuit board in such a manner that the plurality of first terminals and the plurality of second terminals face, respectively; and a plurality of conductors that connect the plurality of first terminals and the plurality of second terminals, respectively, wherein the printed circuit board includes: a first substrate; a plurality of transmission/reception electrodes arranged one-dimensionally or two-dimensionally on the first substrate; and a plurality of beamforming ICs that are arranged on the first substrate and are connected with the plurality of first terminals and the plurality of transmission/reception electrodes, and the TFT substrate includes: a second substrate; a plurality of control circuits that are arranged on the second substrate and are connected to the plurality of second terminals and the plurality of third terminals, each of the control circuits including at least one TFT and generating a control signal that controls one of the plurality of beamforming ICs; and a planarization multilayer arranged on the second substrate in such a manner that the planarization multilayer covers the plurality of control circuits and exposes the plurality of third terminals, the planarization multilayer having a side face and a terrace provided on the side face.

According to one embodiment of the present disclosure, a phased array antenna with high yield and excellent transmission and reception performance is provided.

DESCRIPTION OF THE EMBODIMENTS

Figure 1:
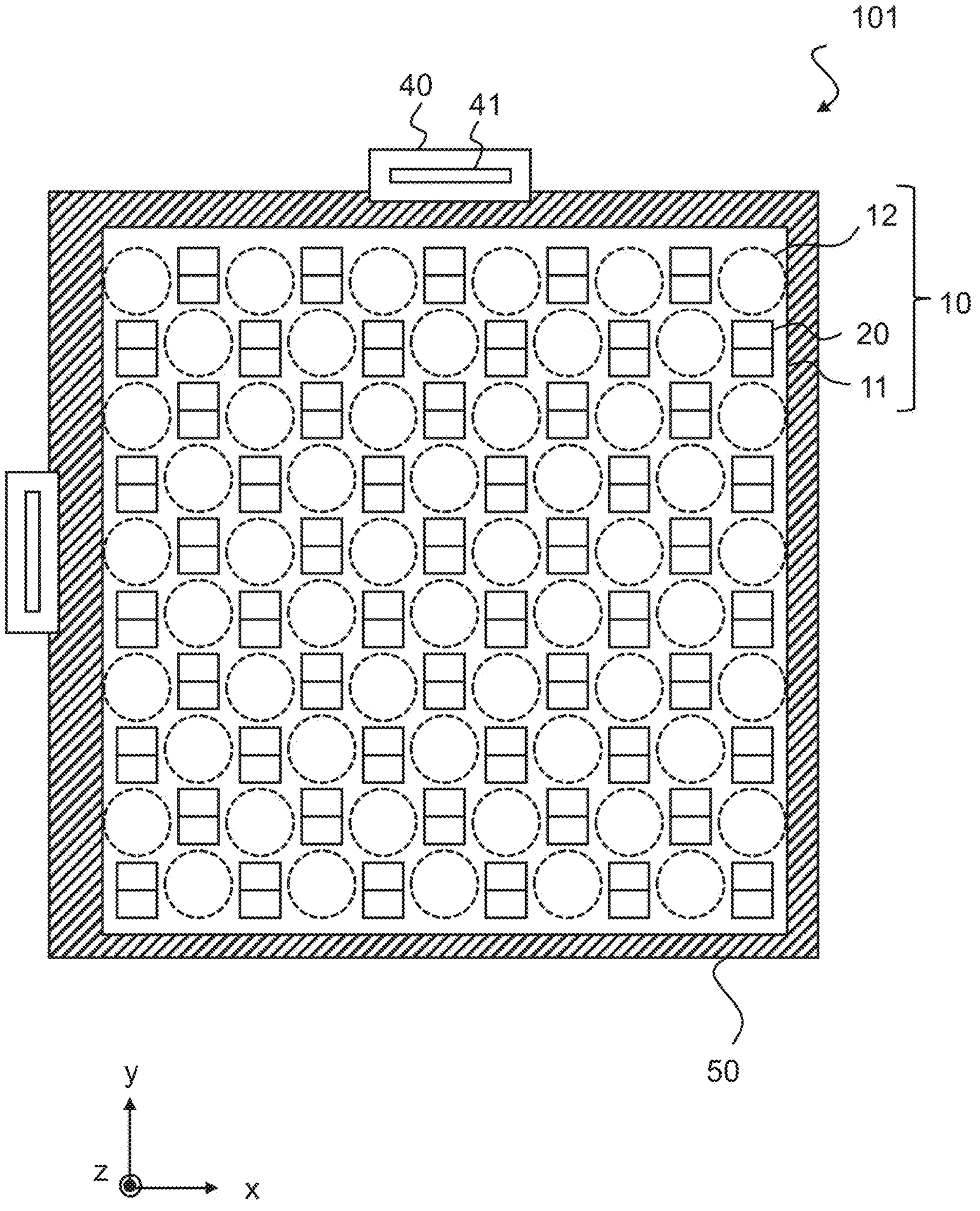
FIG. 1 is a plan view illustrating an exemplary phased array antenna of a first embodiment.

Embodiments of the present disclosure are described below with reference to the drawings. The present disclosure is not limited to the following embodiments, and design changes can be made as appropriate within the scope of satisfying the configuration of the present disclosure. In addition, in the following description, the same parts or parts having similar functions may be designated by the same reference numerals in different drawings, and repeated description thereof may be omitted. Furthermore, the configurations described in the embodiments and modified examples may be combined or modified as appropriate without departing from the scope of the present disclosure. To make the description easy to understand, in the drawings referred to hereinafter, the configurations may be simply illustrated or schematically illustrated, or the illustration of part of constituent members may be omitted. Further, dimension ratios of constituent members illustrated in the drawings do not necessarily indicate actual dimension ratios.

First Embodiment

Figure 2:
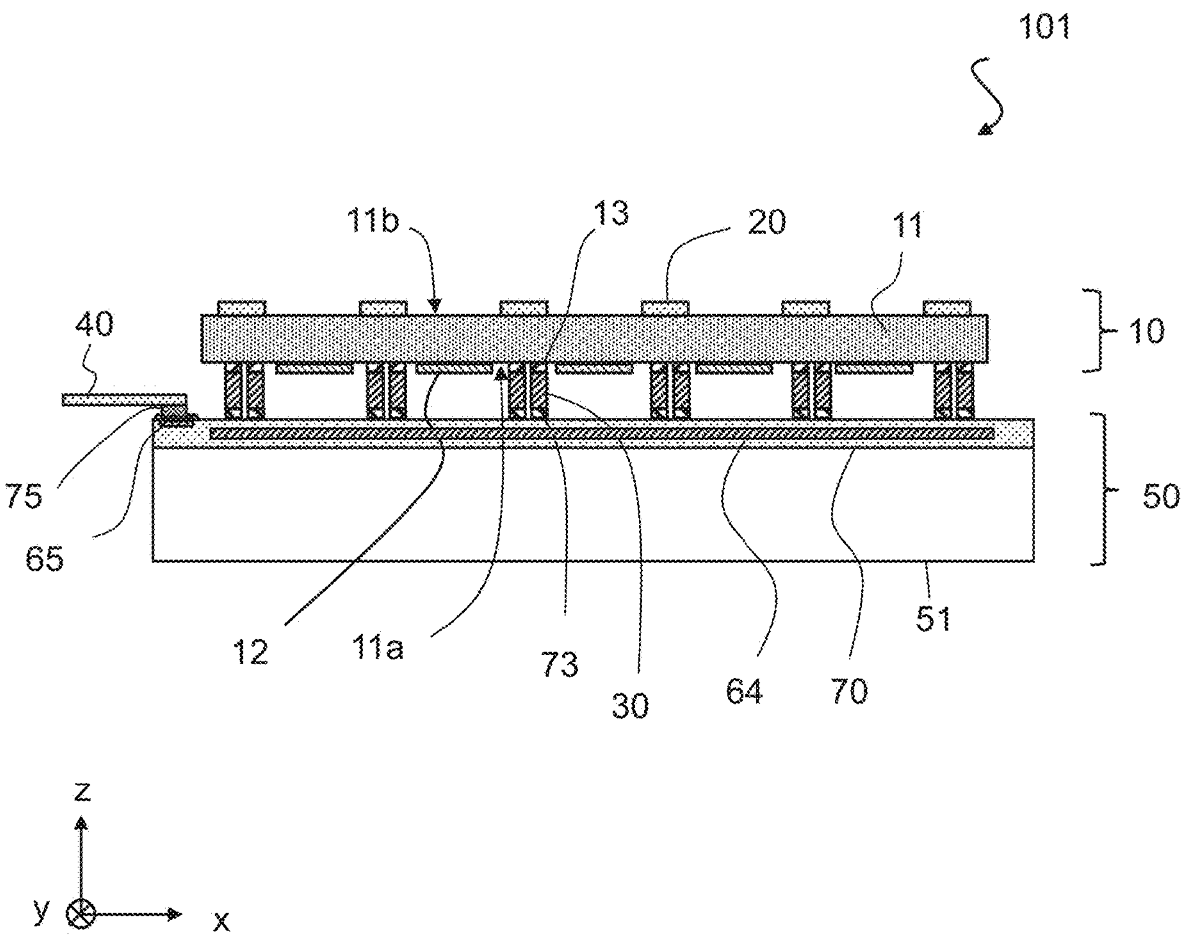
FIG. 2 is a cross-sectional view illustrating an exemplary phased array antenna of the first embodiment.

FIGS. 1 and 2 are a schematic plan view and a schematic cross-sectional view of a phased array antenna 101 of the present embodiment, respectively. The phased array antenna 101 includes a printed circuit board 10, a TFT substrate 50, and a plurality of conductors 30.

The printed circuit board 10 and the TFT substrate 50 are arranged to face each other. Specifically, on surfaces of the printed circuit board 10 and the TFT substrate 50 that face each other, a plurality of first terminals 13 and a plurality of second terminals 73 are provided, respectively. The plurality of first terminals 13 and the plurality of second terminals 73 face each other, respectively, and are connected by the plurality of conductors 30.

The printed circuit board 10 includes a plurality of transmission/reception electrodes for transmitting and receiving electromagnetic waves, and performs beamforming by adjusting the phases of the electromagnetic waves transmitted and received by the respective transmission/reception electrodes, as described later. The TFT substrate 50 includes a plurality of control circuits and transmits various control signals for performing beamforming to the printed circuit board 10 via the conductors 30. Further, the TFT substrate 50 transmits transmission waves via the conductors 30 to the printed circuit board 10, and receives reception waves received by the printed circuit board 10, via the conductor 30 from the printed circuit board 10.

The TFT substrate 50 further includes a plurality of third terminals 67B, and a flexible substrate 40 is connected to the third terminals 67B via the conductors 75, which allows transmission and reception of signals with an external circuit. ICs such as control ICs 41 may be mounted on the flexible substrate 40.

The TFT substrate 50 includes a planarization multilayer 70 on a surface that faces the printed circuit board 10. In order to form a wiring layer 64 that connects the plurality of control circuits formed on the TFT substrate 50 with the plurality of second terminals 73, in a different layer from the plurality of second terminals 73, the planarization multilayer 70 preferably includes at least two planarization layers. However, as will be described later, due to a large thickness of the planarization multilayer 70, it may become difficult to form the second terminals 73 and the wiring layer 64 correctly, which may lead to a decrease in yield. One of the features of the phased array antenna 101 of the present disclosure is that the planarization multilayer has a structure that can suppress such a decrease in yield. The structures of the printed circuit board 10 and the TFT substrate 50 are described in detail below.

The printed circuit board 10 includes a first substrate 11, a plurality of transmission/reception electrodes 12, and a plurality of beamforming ICs 20. The first substrate 11 has a first main surface 11*a* and a second main surface 11*b* located on the opposite side of the first main surface 11*a*. The first main surface 11*a* faces the TFT substrate 50. The printed circuit board 10 is, for example, a multilayer board in which a plurality of wiring layers and a base material layer are laminated. The base material layer is made of, for example, resin alone, or glass fiber impregnated with resin, and the wiring layer is formed by patterning a metal layer such as copper foil. The printed circuit board 10 may be a flexible substrate having flexibility.

The plurality of transmission/reception electrodes 12 are arranged one-dimensionally or two-dimensionally on the first main surface 11*a*. In the present embodiment, the plurality of transmission/reception electrodes 12 are arranged in a staggered manner along the x-axis direction and the y-axis direction. As illustrated in FIG. 1, each transmission/reception electrode 12 is a circular radiation conductor in the present embodiment. However, the transmission/reception electrode 12 may have a shape other than a circular shape, such as a rectangular shape. When the phased array antenna 101 is used for communication in a band ranging from about 1 GHz to about 30 GHZ, the diameter or the length of one side of a rectangle of the transmission/reception electrode 12 as a size thereof is, for example, about sub-millimeter to several millimeters.

The printed circuit board 10 further includes a plurality of power feeding elements that are electrically connected to the beamforming ICs 20 (described later) and feed transmission/reception signals to/from the transmission/reception electrodes 12, respectively.

Each power feeding element may be, for example, a via conductor or a wiring pattern directly connected to the transmission/reception electrode 12, or it may be a strip conductor arranged at a position where it can be electromagnetically coupled with the transmission/reception electrode 12. The power feeding elements are formed inside the first substrate 11 or on the first main surface 11*a*. Each transmission/reception electrode 12 and the power feeding element corresponding to the same constitute one planar antenna. The plurality of planar antennas are arranged one-dimensionally or two-dimensionally to constitute an array antenna.

The plurality of beamforming ICs 20 are arranged on the second main surface 11*b* to be mounted on the first substrate 11. In the example shown in FIGS. 1 and 2, the beamforming ICs 20 are arranged so that the transmission/reception electrodes 12 and the beamforming ICs 20 do not overlap in plan view. The beamforming ICs 20, however, may be arranged to overlap with the transmission/reception electrodes 12 in plan view. Since the beamforming ICs 20 and the transmission/reception electrodes 12 are arranged on different main surfaces of the first substrate 11, respectively, the transmission/reception electrodes 12 can be arranged on the first main surface 11*a* without being constrained by the arrangement of the beamforming ICs 20. This makes it possible to increase the area of the transmission/reception electrodes 12 arranged on the first main surface 11*a*, or to increase the number of the transmission/reception electrodes 12.

In the present embodiment, one beamforming IC 20 controls the phase of one transmission/reception electrode 12. The configuration, however, may be such that one beamforming IC 20 controls the phases of two or more transmission/reception electrodes 12.

Figure 3:
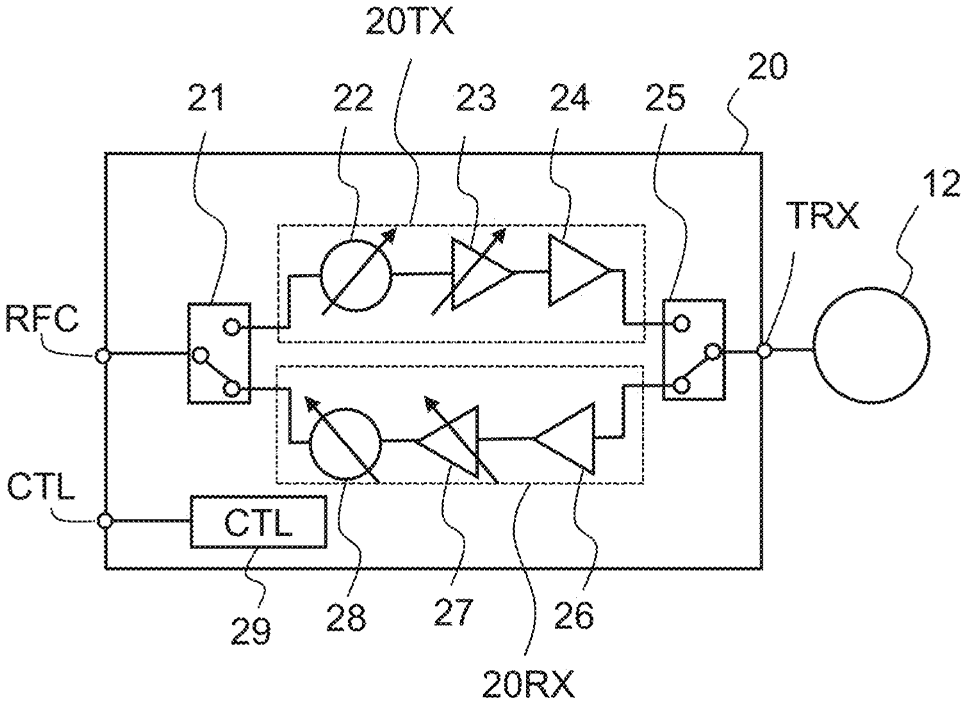
FIG. 3 is a block diagram illustrating a schematic configuration of a beamforming IC.

FIG. 3 is a block diagram illustrating a schematic configuration of the beamforming IC 20. The beamforming IC 20 includes, for example, an antenna switch 21, a phase shifter 22, a variable gain amplifier 23, a power amplifier 24, an antenna switch 25, a low noise amplifier 26, a variable gain amplifier 27, a phase shifter 28, and a controller 29. Furthermore, the beamforming IC 20 includes a transmission/reception terminal TRX, an RF signal terminal RFC, and a control terminal CTL.

The beamforming IC 20 receives a transmission signal from the TFT substrate 50 via the conductor 30, the first terminal 13, and the RF signal terminal RFC. When the antenna switches 21 and 25 select a transmission circuit 20TX, the phase of the transmission signal input from the RF signal terminal RFC is adjusted by the phase shifter 22, and the gain thereof is adjusted by the variable gain amplifier 23. The transmission signal whose phase and gain have been adjusted is amplified by the power amplifier 24 and radiated to the outside from the transmission/reception electrode 12.

The reception signal in the form of radio waves received by the transmission/reception electrode 12 is output to the TFT substrate 50 when the antenna switches 21 and 25 select a reception circuit 20RX. Specifically, the reception signal is amplified by the low noise amplifier 26, its gain is adjusted by the variable gain amplifier 27, and its phase is adjusted by the phase shifter 28. The reception signal whose phase and gain have been adjusted is output to the TFT substrate 50 via the RF signal terminal RFC, the first terminal 13, and the conductor 30.

The beamforming IC 20 receives a control signal via the conductor 30, the first terminal 13, and the control terminal CTL in order to perform the above-described operation. Examples of the control signal include clock signals, bias voltage signals, address signals, signals containing phase information, and the like. Although one control terminal CTL is shown in FIG. 3, the control terminal CTL is composed of multiple terminals so that it receives different types of signals. The controller 29 includes, for example, a memory, a temperature sensor, an interface, and a processor, and controls other block circuits of the beamforming IC 20, such as the antenna switch 21 and the phase shifter 22, based on the control signal.

Figure 4:
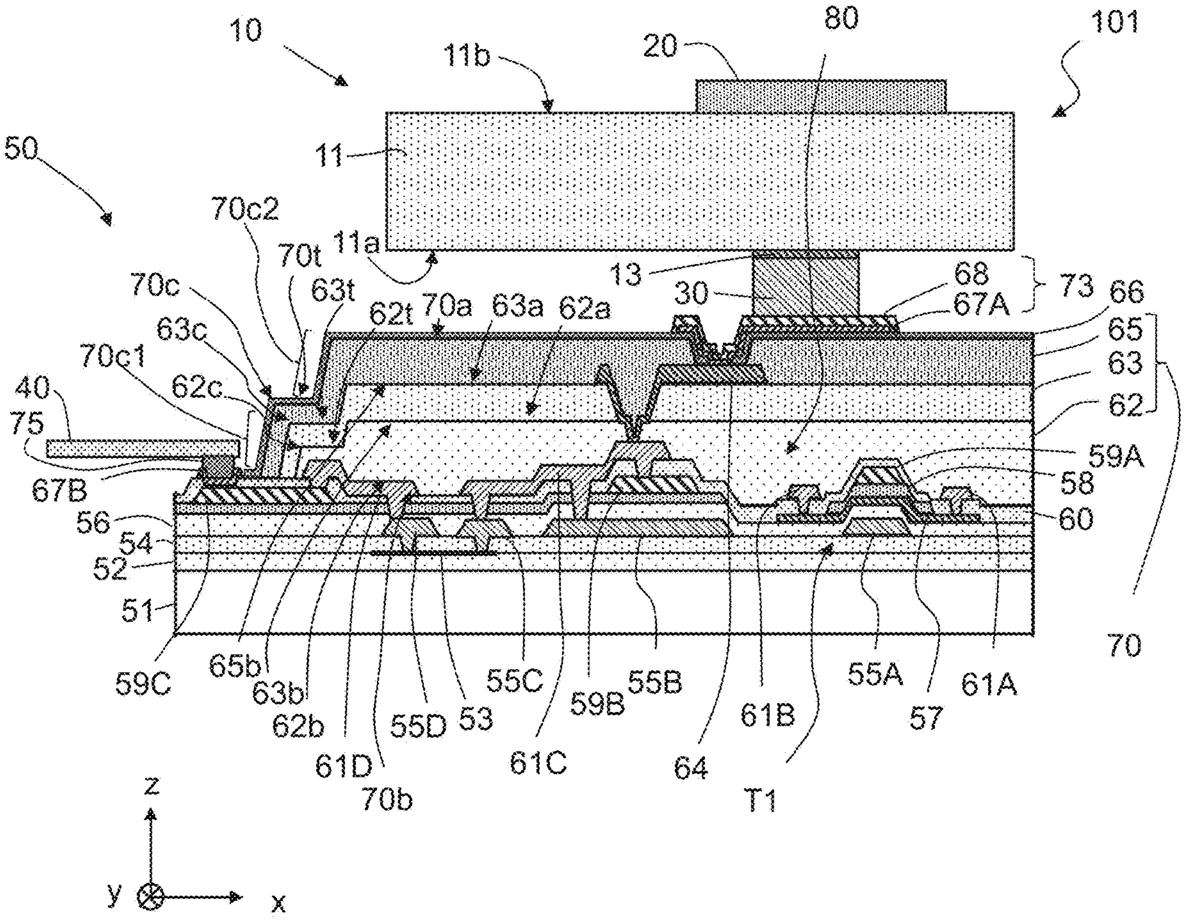
FIG. 4 is a cross-sectional view illustrating an exemplary TFT substrate of the phased array antenna.
Figure 5:
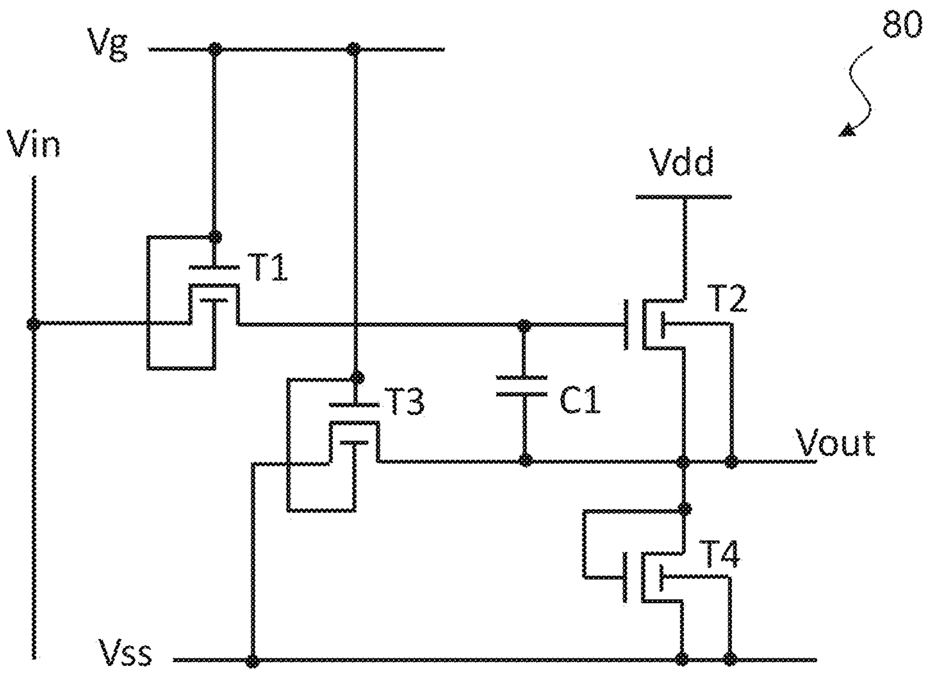
FIG. 5 is a circuit diagram illustrating an exemplary configuration of a control circuit.
Figure 6:
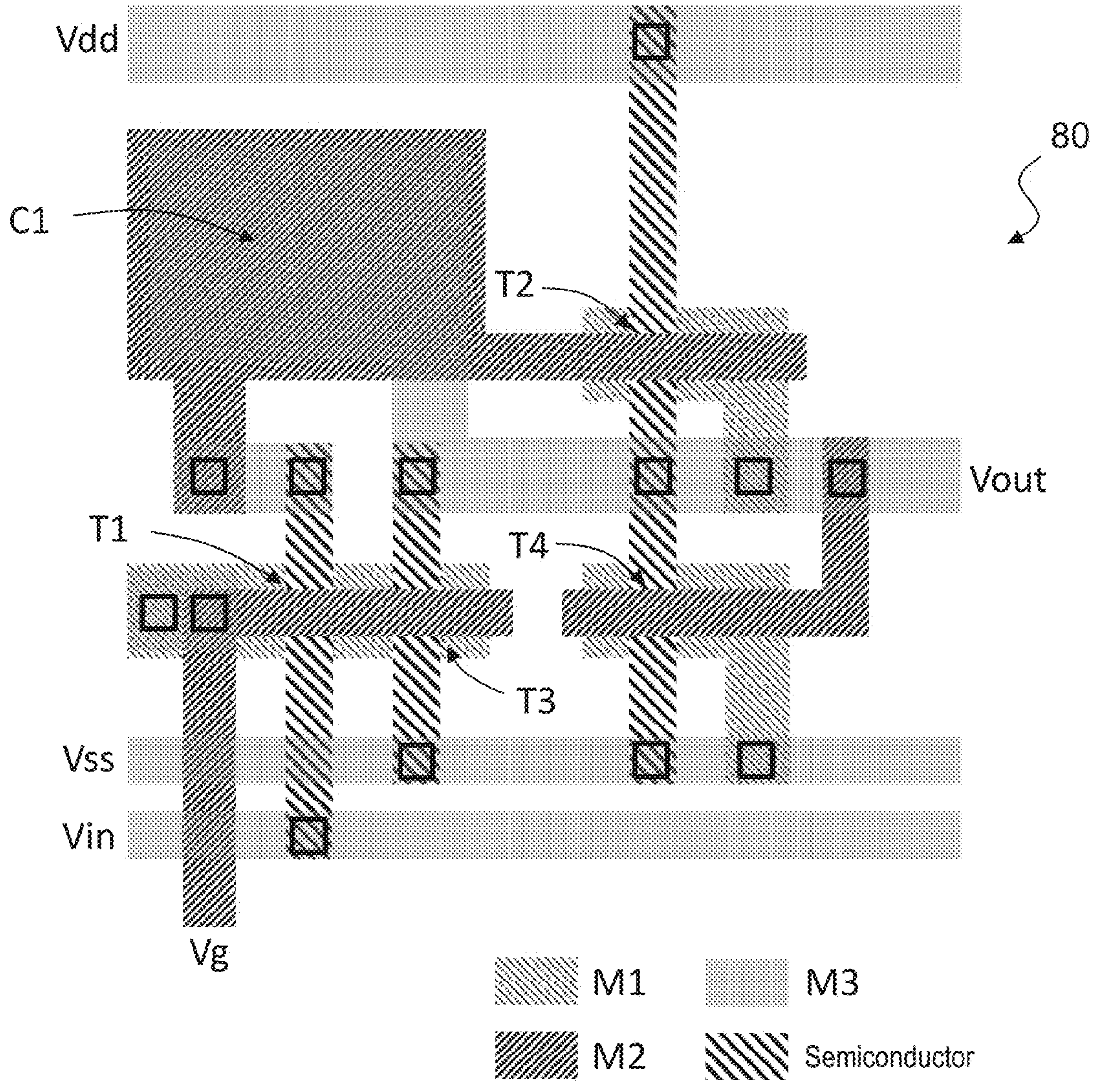
FIG. 6 illustrates an exemplary layout of the control circuit illustrated in FIG. 5

FIG. 4 is a schematic cross-sectional view illustrating an exemplary configuration of the TFT substrate 50. The TFT substrate 50 includes a control circuit that generates at least one of the control signals for controlling the beamforming IC 20 described above. This control circuit includes a TFT. In the present embodiment, the TFT substrate 50 includes, for example, a plurality of control circuits 80 for generating bias voltage signals for the respective beamforming ICs 20. FIG. 5 is a circuit diagram illustrating an exemplary configuration of the control circuit 80. FIG. 6 illustrates an exemplary layout of the circuit illustrated in FIG. 5.

The control circuit 80 includes a bias voltage generating circuit. The bias voltage generating circuit includes transistors T1 to T4. As detailed below in detail, the transistors T1 to T4 are TFTs, preferably with a double gate structure to increase reliability.

When a voltage is applied to Vg and the transistors T1 and T3 are on, a bias voltage signal with a magnitude corresponding to Vin is output from Vout. Furthermore, when Vg is at a zero volt level and the transistors T1 and T3 are off, a constant voltage determined by the capacitance accumulated in a capacitor C1 is output from Vout.

FIG. 4 illustrates the structure of the TFT substrate 50 in a cross section including the transistor T1 of the control circuit 80. The TFT substrate 50 includes a second substrate 51. The second substrate 51 is preferably made of an insulating material that is not substantially deformed by the heat to which the second substrate 51 is exposed during the manufacture of the TFT substrate 50. The second substrate 51 is, for example, a glass substrate. The second substrate 51 may be made of a material having a coefficient of thermal expansion comparable to that of the first substrate 11. For example, the second substrate 51 may be made of the same material as that of the base material layer of the first substrate 11.

When the printed circuit board 10 and the TFT substrate 50 are heated and bonded in the manufacturing process of the phased array antenna 101, if there is a large difference between the coefficient of thermal expansion of the first substrate 11 of the printed circuit board 10 and that of the second substrate 51 of the TFT substrate 50, a difference occurs between the amount of shrinkage of the first substrate 11 and that of the second substrate 51 when the phased array antenna 101 returns to room temperature after bonding. It is conceivable that this would cause a large stress to be generated near the first terminal 13 of the first substrate 11 and the second terminal 73 of the second substrate 51, or one of the printed circuit board 10 and the TFT substrate 50 to be warped, resulting in that due to the stress or the warpage, the phased array antenna 101 cannot fully demonstrate the desired performance, or reliability of the same may deteriorate. By selecting the materials of the first substrate 11 and the second substrate 51 so that the difference between the coefficient of thermal expansion of the first substrate 11 and that of the second substrate 51 is small, the occurrence of such a problem can be suppressed.

Alternatively, the second substrate 51 may be constituted by a flexible substrate made of polyimide resin or the like. The second substrate 51 may be made of glass, and the first substrate 11 may be constituted by a flexible substrate. If either the first substrate 11 or the second substrate 51 is constituted by a flexible substrate, even if there is a difference in the amount of expansion or shrinkage due to the difference between the coefficients of thermal expansion, the bending of the flexible substrate makes it possible to suppress stress from being applied to bonded parts and the substrates. In this case, from the viewpoint of ensuring the rigidity of the entire phased array antenna 101, it is preferable that the other of the first substrate 11 and the second substrate 51 is constituted by a rigid substrate rather than a flexible substrate.

The TFT substrate 50 includes a base coat layer 52, a resistance layer 53, an interlayer insulating layer 54, a first gate electrode 55A, wiring layers 55B, 55C, 55D, a bottom gate insulating layer 56, a semiconductor layer 57, a top gate insulating layer 58, a second gate electrodes 59A, wiring layers 59B, 59C, an interlayer insulating layer 60, wiring layers 61A, 61B, 61C, 61D, a planarization multilayer 70, a wiring layer 64, a protective layer 66, an electrode layer 67A, a third terminal 67B, and a pad 68.

The base coat layer 52 is arranged on the main surface of second substrate 51. The base coat layer 52 adjusts the stress difference between the second substrate 51 and the laminate structure above the base coat layer 52. The base coat layer 52 is made of, for example, silicon oxide, and has a thickness of 100 nm. The base coat layer 52 may be made of silicon nitride.

The resistance layer 53 is located on the base coat layer 52. The resistance layer 53 is part of a voltage divider circuit formed on the TFT substrate 50, and the voltage divider circuit is included in the control circuit 80. The resistance layer 53 has a higher resistivity than good conductors such as copper and aluminum. For example, the resistance layer 53 is made of a transparent electrode material such as indium tin oxide, indium zinc oxide, or tin oxide, which has a resistivity of about several hundred μΩ·cm to several mΩ·cm.

The interlayer insulating layer 54 is located on the base coat layer 52, covering the resistance layer 53. The interlayer insulating layer 54 is made of, for example, silicon oxide, and has a thickness of 300 nm.

The first gate electrode 55A, as well as the wiring layers 55B, 55C, and 55D are arranged on the interlayer insulating layer 54. Of these, the wiring layers 55C and 55D are connected to the resistance layer 53 through contact holes provided in the interlayer insulating layer 54. The first gate electrode 55A, as well as the wiring layers 55B, 55C, and 55D are, for example, made of molybdenum and have a thickness of 260 nm. The first gate electrode 55A, as well as the wiring layers 55B, 55C, and 55D are indicated by M1 in FIG. 6.

The bottom gate insulating layer 56 is located on the interlayer insulating layer 54, covering the first gate electrode 55A as well as the wiring layers 55B, 55C, and 55D. The bottom gate insulating layer 56 has, for example, a laminate structure including a 50 nm thick silicon oxide layer and a 325 nm thick silicon nitride layer.

The semiconductor layer 57 is located so as to overlap the first gate electrode 55A in plan view. Preferably, the semiconductor layer 57 is made of amorphous silicon, low temperature polycrystalline silicon (LTPS), or an oxide semiconductor. As the oxide semiconductors, the following can be used: copper oxide; silver oxide; zinc oxide; gallium oxide; tin oxide; indium oxide; indium gallium zinc oxide; indium tin oxide; indium zinc oxide; titanium oxide; indium titanium oxide; and indium titanium zinc oxide. For example, the semiconductor layer 57 is, for example, made of indium gallium zinc oxide and has a thickness of 30 nm.

The low temperature polycrystalline silicon and the oxide semiconductor are characterized by high electron mobility and high driving ability, and have excellent response at high frequencies. In addition, a transistor including an oxide semiconductor is characterized by low leakage current when turned off.

The top gate insulating layer 58 is located on the semiconductor layer 57, covering at least the upper part of the first gate electrode 55A. The top gate insulating layer 58 is, for example, made of silicon oxide and has a thickness of 150 nm.

The second gate electrode 59A, as well as the wiring layers 59B and 59C are located on the top gate insulating layer 58. Of these, the second gate electrode 59A is located so as to overlap the first gate electrode 55A with the semiconductor layer 57 being interposed therebetween. The second gate electrode 59A as well as the wiring layers 59B and 59C have, for example, a three-layer structure of titanium/aluminum/titanium, in which the thickness of titanium is 30 nm each, and the thickness of aluminum is 300 nm. The second gate electrode 59A, as well as the wiring layers 59B and 59C are indicated by M2 in FIG. 6.

The interlayer insulating layer 60 is located on the top gate insulating layer 58, covering the second gate electrode 59A as well as the wiring layers 59B and 59C. The interlayer insulating layer 60 has, for example, a laminate structure including a 200 nm thick silicon nitride layer and a 380 nm thick silicon oxide layer.

The wiring layers 61A, 61B, 61C, and 61D are located on the interlayer insulating layer 60. Each of the wiring layers 61A, 61B, 61C, and 61D has, for example, a laminate structure including a 630 nm thick copper layer and a 30 nm thick titanium layer. The wiring layers 61A and 61B are connected to the semiconductor layer 57 through contact holes provided in the interlayer insulating layer 60, respectively. Further, the wiring layer 61C is connected to the wiring layer 59B through a contact hole provided in the interlayer insulating layer 60, and is connected to the wiring layer 55B and the wiring layer 55C through contact holes provided in the interlayer insulating layer 60, the top gate insulating layer 58, and the bottom gate insulating layer 56. The wiring layer 61D is connected to the wiring layer 55D through a contact hole provided in the interlayer insulating layer 60, the top gate insulating layer 58, and the bottom gate insulating layer 56, and is connected to the wiring layer 59C through a contact hole provided in the interlayer insulating layer 60. The wiring layers 61A, 61B, 61C, and 61D are indicated by M3 in FIG. 6. The control circuit 80 is constituted by these wiring layers and TFTs.

The planarization multilayer 70 flattens the surface of the second substrate 51 on which a plurality of the control circuits 80 are formed in order to support the printed circuit board 10. Specifically, the planarization multilayer 70 is placed on the second substrate 51, in such a manner that it covers the plurality of control circuits 80 and exposes the third terminals 67B. More specifically, the planarization multilayer 70 is located on the interlayer insulating layer 60, covering the wiring layers 61A, 61B, 61C, and 61D.

The planarization multilayer 70 has a top face 70*a*, a bottom face 70*b*, and a side face 70*c* extended between the top face 70*a* and the bottom face 70*b*. Furthermore, the planarization multilayer 70 has at least one terrace 70*t* on the side face 70*c*. The terrace 70*t* is located between the top face 70*a* and the bottom face 70*b* in the height direction, and divides the side face 70*c* into two faces, that is, a lower side face 70*c*1 and an upper side face 70*c*2. It may be expressed that the planarization multilayer 70 has a step on the side face 70*c*. In this case, the at least one terrace 70*t* is a stair tread.

The terrace 70*t* is, for example, a flat face that forms an angle within +30° with respect to the top face 70*a*. Further, a distance between a position at which the terrace 70*t* is in contact with the lower side face 70*c*1 and a position at which the terrace 70*t* is in contact with the upper side face 70*c*2, that is, the depth of the terrace 70*t*, is 1.0 μm or more and 4.0 μm or less, for example.

As will be described in detail below, with such a configuration that the planarization multilayer 70 has the terrace 70*t* on the side face 70*c*, when the side face 70*c* is covered with photoresist in the manufacturing process of the TFT substrate 50, the maximum thickness in the height direction of the photoresist can be reduced. This makes it possible to suppress resist remaining caused by exposure and development.

In order to form the wiring layer 64, which connects the plurality of control circuits 80 formed on the TFT substrate 50 with the plurality of second terminals 73, in a different layer from the layer in which the plurality of second terminals 73 are formed, the planarization multilayer 70 preferably includes two or more planarization layers. More specifically, the planarization multilayer 70 includes a first planarization layer 62 and a second planarization layer 63. The first planarization layer 62 has a top face 62*a*, a bottom face 70*b*, and a side face 62*c*, and the second planarization layer 63 has a top face 63*a*, a bottom face 63*b*, and a side face 63*c*. The first planarization layer 62 is located on the second substrate 51, covering the plurality of control circuits 80, and the second planarization layer 63 covers the top face 62*a* and the side face 62*c* of the first planarization layer 62.

The first planarization layer 62 has a first terrace 62*t* on the side face 62*c*, and the second planarization layer 63 has a second terrace 63*t* on the side face 63*c*. In plan view, the second terrace 63*t* overlaps a part of the first terrace 62*t*, and a part of the second terrace 63*t* is located above the first terrace 62*t*.

In the present embodiment, the planarization multilayer 70 further includes a third planarization layer 65. The third planarization layer 65 has the top face 70*a*, the bottom face 65*b*, the side face 70*c*, and the terrace 70*t*, and covers the top face 63*a* and the side face 63*c* of the second planarization layer 63. The top face 70*a*, the side face 70*c*, and the terrace 70*t* are also the top face 70*a*, the side face 70*c*, and the terrace 70*t* of the planarization multilayer 70, respectively. In plan view, the terrace 70*t* overlaps a part of the second terrace 63*t* and a part of the first terrace 62*t*, and a part of the terrace 70*t* is located above the second terrace 63*t*.

The first planarization layer 62, the second planarization layer 63, and the third planarization layer 65 each have a thickness of approximately 1 μm or more and 4 μm or less, for example. More preferably, the maximum thickness of at least one of the first planarization layer, the second planarization layer, and the third planarization layer is 2 μm or more. Since the maximum thickness is 2 μm or more, the upper surface of the second substrate 51 can be flattened, even if large irregularities are formed due to a plurality of control circuits 80 formed thereon.

The first planarization layer 62, the second planarization layer 63, and the third planarization layer 65 are preferably made of an organic material, that is, a synthetic resin. An organic material has a lower dielectric constant than inorganic materials, which reduces the capacitance between wiring layers and suppresses parasitic capacitance. Specifically, the first planarization layer 62, the second planarization layer 63, and the third planarization layer 65 preferably contain acrylic resin or polyimide resin as a main component, and are more preferably made of polyimide resin. Polyimide resin has a lower dielectric loss tangent than other resins such as acrylic resin. Therefore, by forming the first planarization layer 62, the second planarization layer 63, and the third planarization layer 65 with polyimide resin, dielectric loss can be reduced when the wiring layer transfers a transmission signal or a reception signal.

The wiring layer 64 is located on the second planarization layer 63, in the form illustrated in FIG. 4. The wiring layer 64 has, for example, a laminate structure including a 630 nm thick copper layer and a 30 nm thick titanium layer. The wiring layer 64 is connected to the wiring layer 61C through a contact hole provided in the first planarization layer 62 and the second planarization layer 63.

The protective layer 66 is located to cover the entire structure of the main surface of the second substrate 51 including the third planarization layer 65. The protective layer 66 is, for example, made of silicon nitride and has a thickness of 200 nm.

The electrode layer 67A and the third terminal 67B are, for example, made of indium zinc oxide and have a thickness of 125 nm. The electrode layer 67A is connected to the wiring layer 64 through a contact hole provided in the protective layer 66 and the third planarization layer 65, and the third terminal 67B is connected to the wiring layer 59C through a contact hole provided in the protective layer 66.

The pad 68 is located on the third terminal 67B. The pad 68 has, for example, a laminate structure including a 300 nm thick copper layer and a 30 nm thick titanium layer. The pad 68 and the electrode layer 67A constitute the second terminal 73. With the connection between the conductor 30 and the second terminal 73, the printed circuit board 10 and the TFT substrate 50 are electrically connected, and the transmission signal and the reception signal are transferred between the printed circuit board 10 and the TFT substrate 50. In addition, control signals for controlling the beamforming ICs 20 are transferred from the TFT substrate 50 to the printed circuit board 10.

The third terminal 67B is connected to the flexible substrate 40 via the conductor 75, and transfers a transmission signal, a reception signal, and a control signal to a communication unit outside the phased array antenna 101.

In the present embodiment, the TFT substrate 50 includes the first planarization layer 62 and the second planarization layer 63, but these two may be formed integrally. Further, each of the wiring layers, the first gate electrode, the second gate electrode, and the electrode layer may be constituted by one or more layers of molybdenum, aluminum, titanium, and copper, or may be constituted by a layer of an alloy of these.

As described with reference to FIG. 4, the transistor T1 has a double gate structure having the first gate electrode 55A and the second gate electrode 59A The transistors T2, T3, and T4 preferably also have a double gate structure, as illustrated in FIG. 6. Similar to the transistor T1, the transistors T2, T3, and T4 can also be constituted by wiring layers denoted by M1 and M2 formed at the same time as the first gate electrode 55A and the second gate electrode 59A. Further, the capacitor C1 can be formed by, for example, a wiring layer denoted by M2 formed at the same time as the second gate electrode 59A as well as the wiring layers 59B and 59C, a wiring layer denoted by M3 formed at the same time as the wiring layers 61A, 61B, 61C, and 61D, and an interlayer insulating layer 60 located between these.

Next, a method for manufacturing the TFT substrate 50 is described. The TFT substrate 50 can be manufactured using general semiconductor device manufacturing technology. An exemplary method for manufacturing the TFT substrate 50 is described, with reference to FIGS. 7 to 17.

Figure 7:
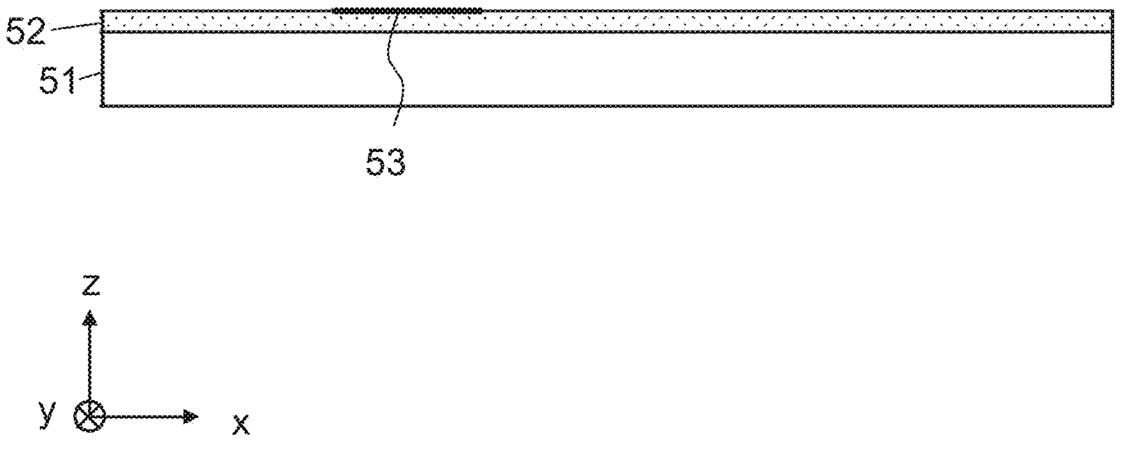
FIG. 7 is a process cross-sectional view illustrating a method for manufacturing the TFT substrate.

First, as illustrated in FIG. 7, a base coat layer 52 made of silicon oxide having a thickness of 100 nm is formed on a second substrate 51 made of glass, using a CVD device. Next, using a sputtering device, an 80 nm thick indium zinc oxide film is formed. By patterning the indium zinc oxide film, a resistance layer 53 is obtained.

Figure 8:
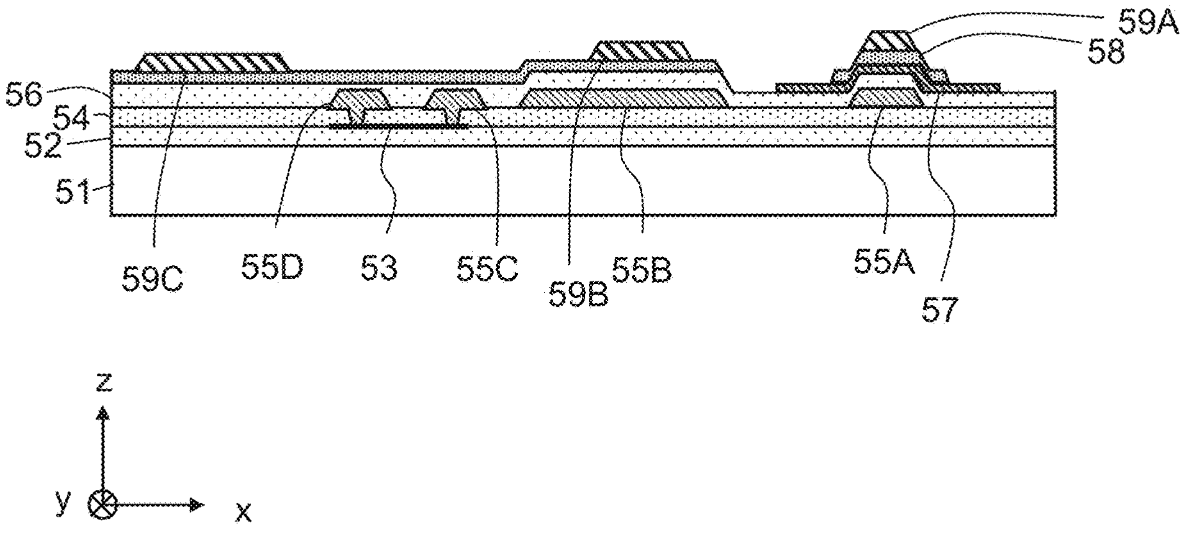
FIG. 8 is a process cross-sectional view illustrating the method for manufacturing the TFT substrate.

As illustrated in FIG. 8, an interlayer insulating layer 54 made of silicon oxide having a thickness of 300 nm is formed on the resistance layer 53 and the base coat layer 52, using a CVD device.

After a contact hole exposing a part of the resistance layer 53 is formed in the interlayer insulating layer 54, a 260 nm thick molybdenum film is formed in the contact hole and on the interlayer insulating layer 54, using a sputtering device. By patterning the molybdenum film, a first gate electrode 55A, as well as wiring layers 55B, 55C, and 55D are formed.

Next, using a CVD device, a bottom gate insulating layer 56 including a 50 nm thick silicon oxide film and a 325 nm thick silicon nitride film is formed on the interlayer insulating layer 54, the first gate electrode 55A, as well as the wiring layers 55B, 55C, and 55D. Thereafter, a 30 nm thick indium gallium zinc oxide film is formed on the bottom gate insulating layer 56 using a sputtering device, and it was annealed and patterned, whereby a semiconductor layer 57 is formed.

A 150 nm thick silicon oxide film is formed on the semiconductor layer 57 and the bottom gate insulating layer 56 using a CVD device, and the silicon oxide film was annealed, whereby a top gate insulating layer 58 is formed.

A 30 nm thick titanium film, a 300 nm thick aluminum film, and a 30 nm thick titanium film are sequentially formed on the top gate insulating layer 58 using a sputtering device, and they are patterned, whereby a second gate electrode 59A as well as wiring layers 59B and 59C are formed.

Figure 9:
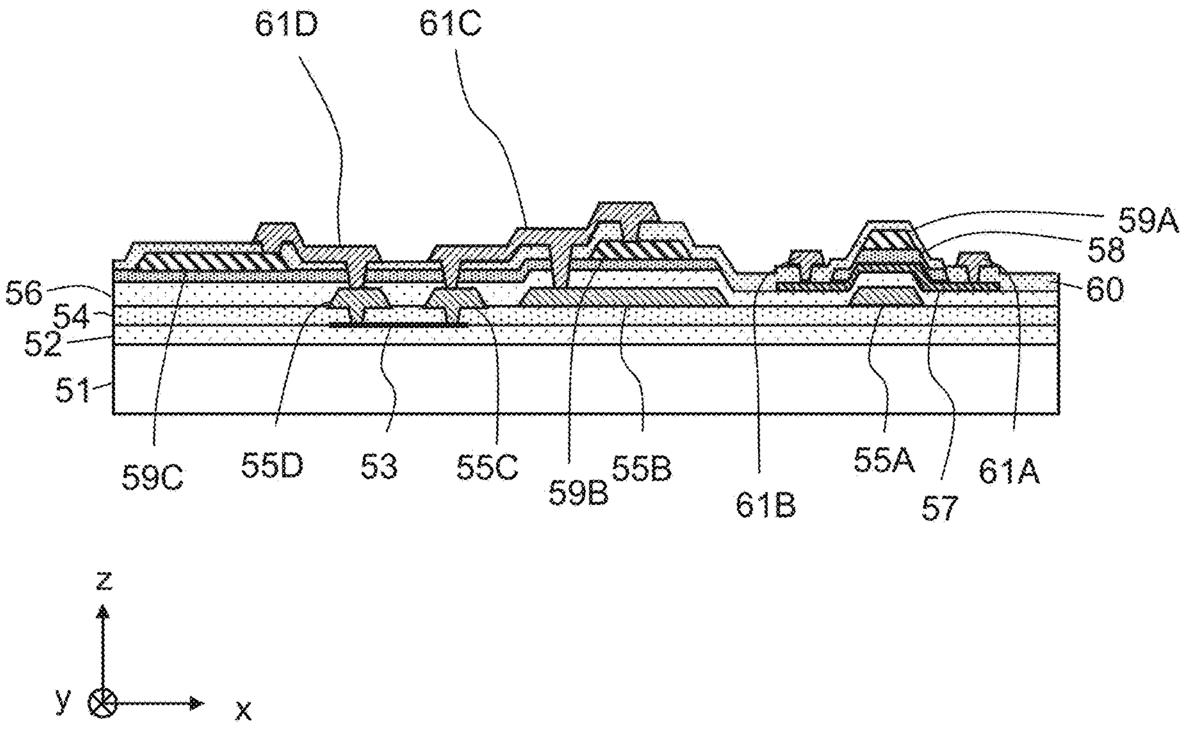
FIG. 9 is a process cross-sectional view illustrating the method for manufacturing the TFT substrate.

As illustrated in FIG. 9, an interlayer insulating layer 60 including a 200 nm thick silicon nitride film and a 380 nm thick silicon oxide film is formed on the second gate electrode 59A, the wiring layers 59B, 59C, and the top gate insulating layer 58, using a CVD device.

Contact holes that expose parts of the wiring layers 59B, 55B, 55C, 55D, and 59C are formed in the interlayer insulating layer 60, the top gate insulating layer 58, and the bottom gate insulating layer 56, and thereafter, a 630 nm thick copper film and a 30 nm thick titanium film are formed in the contact holes and on the interlayer insulating layer 60. The copper film and the titanium film are patterned, whereby wiring layers 61A, 61B, 61C, and 61D are formed. Thereby the plurality of control circuits 80 are formed on the second substrate 51.

Next, a planarization multilayer 70 on which a wiring layer 64 is formed is formed. The planarization multilayer 70 includes a first planarization layer 62, a second planarization layer 63, and a third planarization layer 65, each of which is constituted by a 1 μm to 4 μm thick film made of acrylic resin or polyimide resin.

Figure 10:
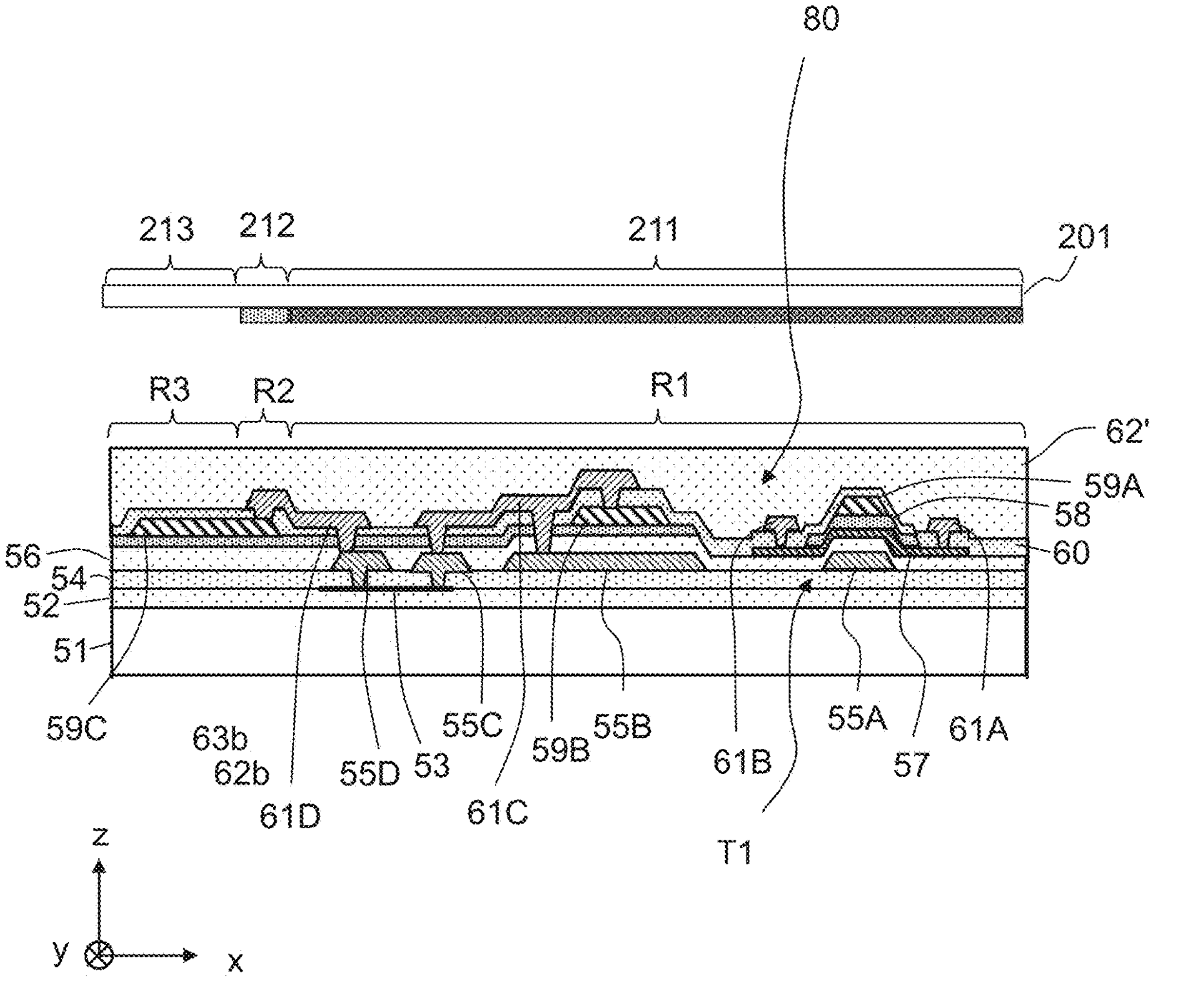
FIG. 10 is a process cross-sectional view illustrating the method for manufacturing the TFT substrate.

First, as illustrated in FIG. 10, an uncured first planarization layer 62' is formed by coating on the second substrate 51 so as to cover the control circuit 80, and the uncured first planarization layer 62' is exposed using a multi-tone mask 201. The multi-tone mask 201 is also called a gray-tone mask or a half-tone mask, and has a light-shielding part 211 that blocks exposure light, a semi-transmissive part 212 that blocks part of the exposure light, and a transmissive part 213 that does not block the exposure light. In the present embodiment, the light transmittance in the semi-transmissive part 212 is approximately uniform over the entire region of the semi-transmissive part 212. However, the transmittance of the semi-transmissive part 212 may have a non-uniform distribution.

By performing exposure using the multi-tone mask 201, light is substantially blocked in a region R1, a sufficient amount of light to remove the uncured first planarization layer 62' is applied to a region R3, and an amount of light at a level of removing a part of the uncured first planarization layer 62' is applied to a region R2.

Figure 11:
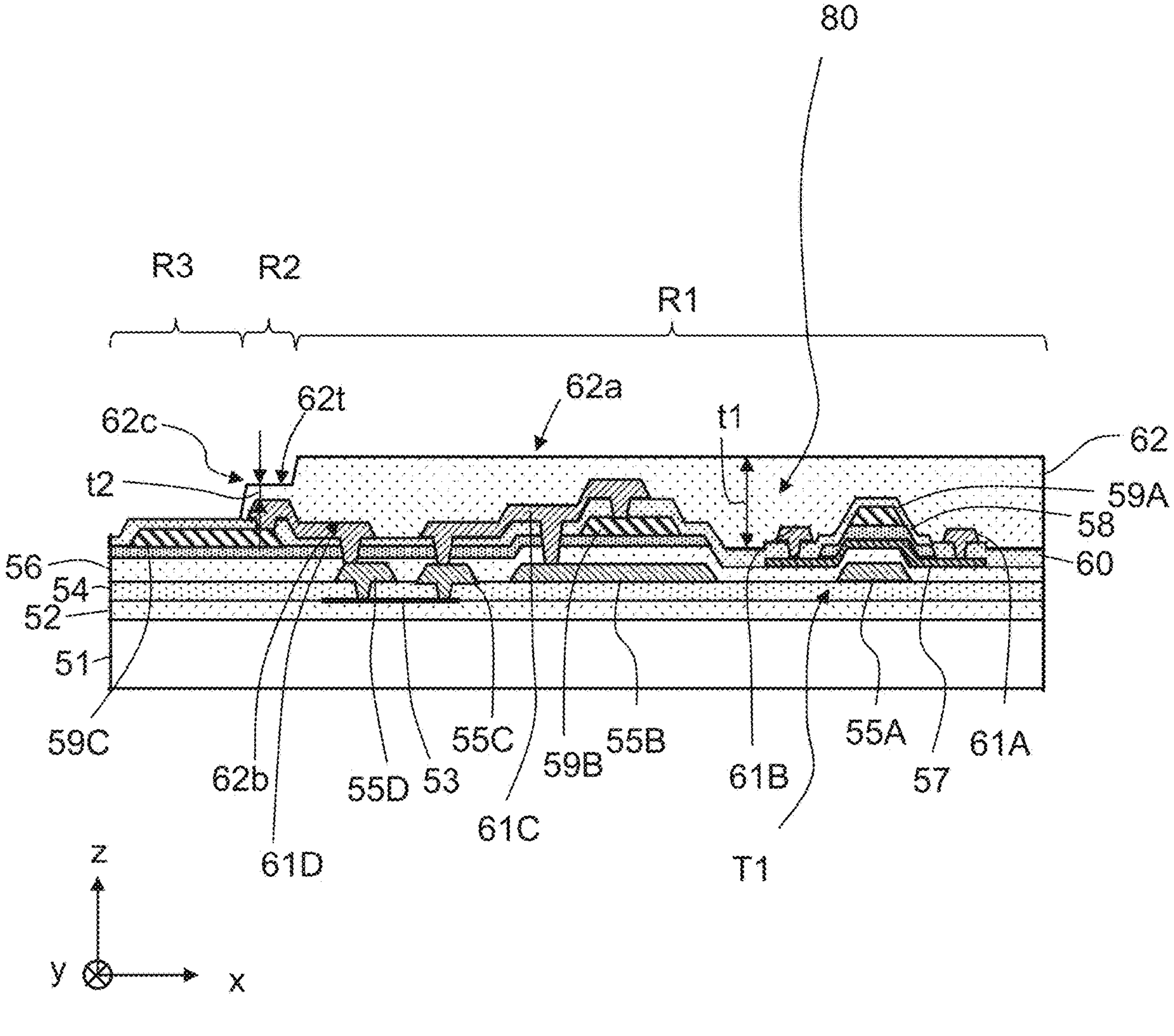
FIG. 11 is a process cross-sectional view illustrating the method for manufacturing the TFT substrate.

Thereafter, the uncured first planarization layer 62' is developed and heat-treated to obtain the first planarization layer 62 as shown in FIG. 11. The first planarization layer 62 has a maximum thickness of t1 in the region R1, and has a maximum thickness of t2 that is smaller than t1 in the region R2. Furthermore, in the region R3, the first planarization layer 62 is not formed, and the interlayer insulating layer 60 is exposed. With such a thickness distribution, the first planarization layer 62 has a top face 62*a*, a bottom face 62*b*, a side face 62*c*, and a first terrace 62*t* located on the side face.

Figure 12:
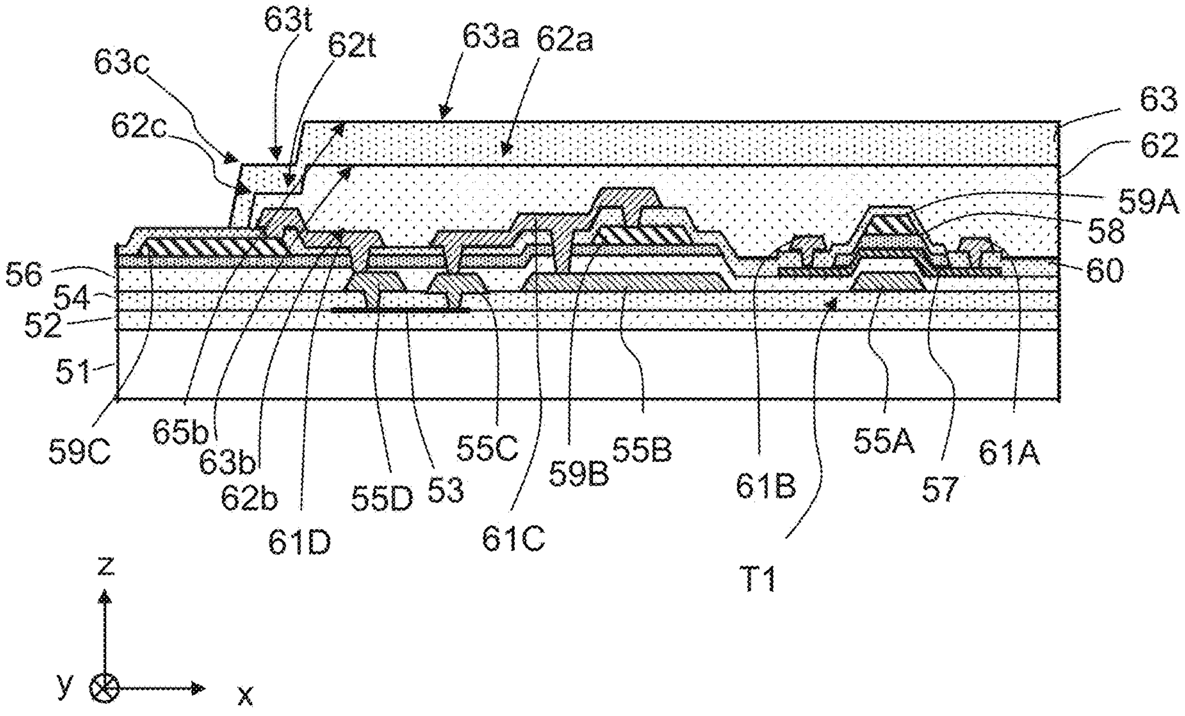
FIG. 12 is a process cross-sectional view illustrating the method for manufacturing the TFT substrate.

As illustrated in FIG. 12, using a similar photolithography technique, a second planarization layer 63 having a top face 63*a*, a bottom face 63*b*, a side face 63*c*, and a second terrace 63*t* located on the side face 63*c* is formed on the first planarization layer 62.

Figure 13:
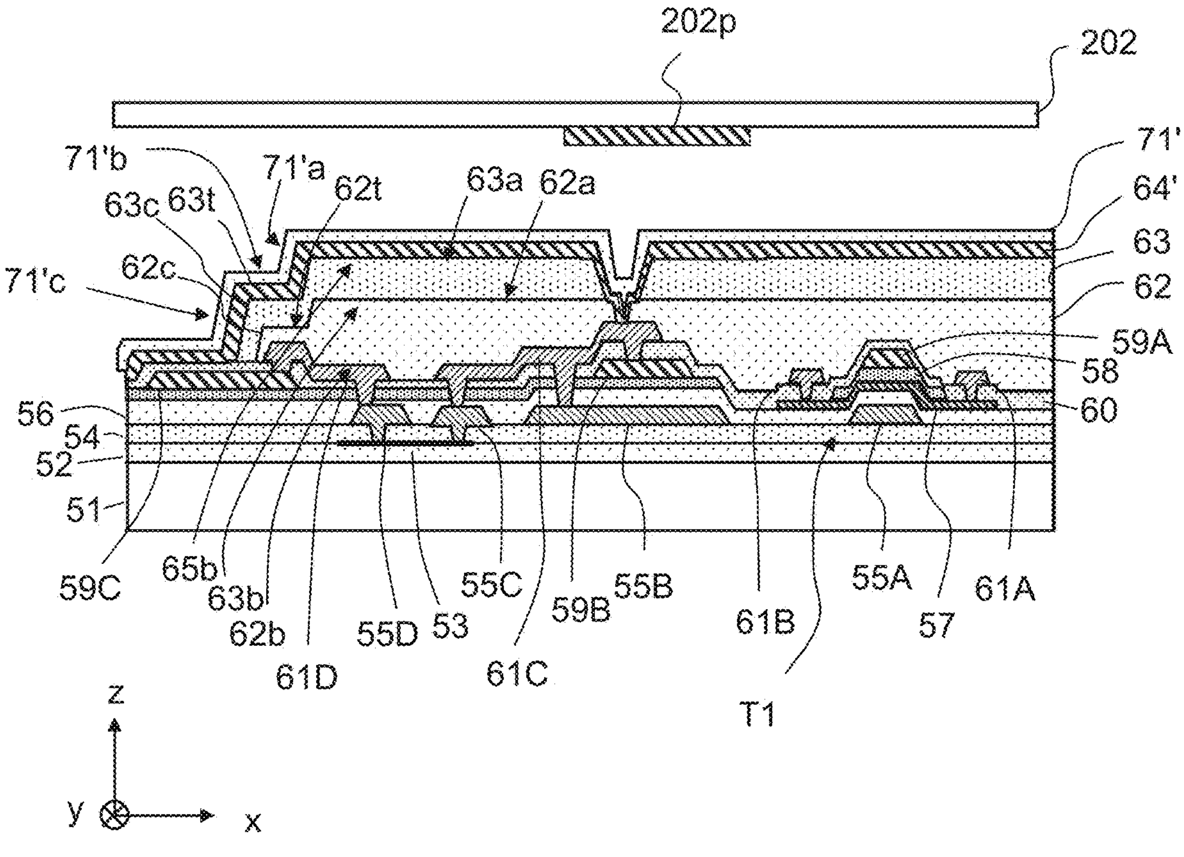
FIG. 13 is a process cross-sectional view illustrating the method for manufacturing the TFT substrate.

As illustrated in FIG. 13, a contact hole exposing a part of the wiring layer 61C is formed in the first planarization layer 62 and the second planarization layer 63, and a metal film 64' is formed on the second planarization layer 63, in the contact hole, and on a part of the interlayer insulating layer 60. Further, an uncured resist film 71' is formed thereon. The metal film 64' includes, for example, a 630 nm thick copper layer and a 30 nm thick titanium layer. At this time, since the second terrace 63*t* is formed on the side face 63*c* of the second planarization layer 63, the uncured resist film 71' formed on the side face 63*c* of the second planarization layer 63 is divided into two parts, an inclined part 71'*a* and an inclined part 71'*c*, by a horizontal part 71'*b* formed on the second terrace 63*t*.

Figure 14:
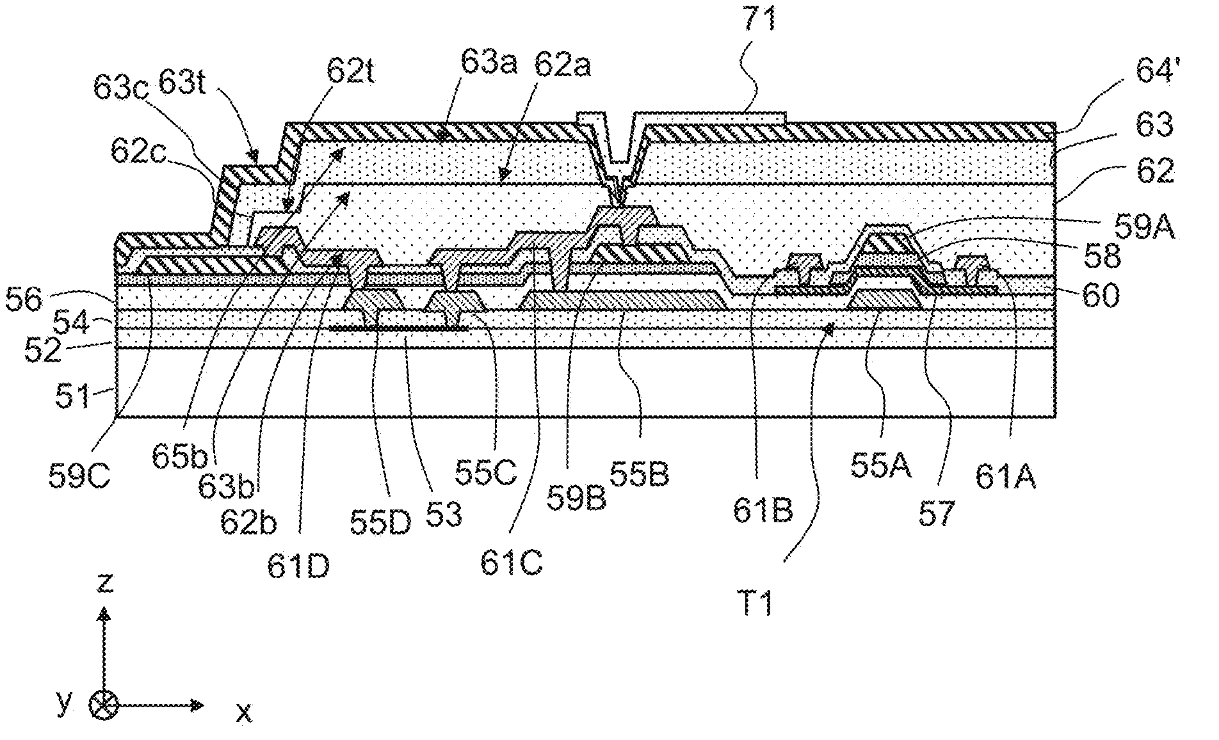
FIG. 14 is a process cross-sectional view illustrating the method for manufacturing the TFT substrate.

Using an exposure mask 202 having a pattern 202*p* corresponding to the wiring layer 64, the uncured resist film 71' is exposed and developed. The uncured resist film 71' on the side face 63*c* of the second planarization layer 63 is divided into two parts, the inclined part 71'*a* and the inclined part 71'*c*, by the horizontal part 71'*b*. Therefore, the maximum thickness in the vertical direction (y-axis direction) of the uncured resist film 71' on the side face 63*c* is smaller than when the horizontal part 71'*b* is not formed, that is, when the second terrace 63*t* is not formed. As a result, this prevents the amount of light from becoming insufficient during exposure, which prevents the resist film from remaining. Thereby, as illustrated in FIG. 14, the resist pattern 71 can be formed without any resist remaining on the side face 63*c*.

Figure 15:
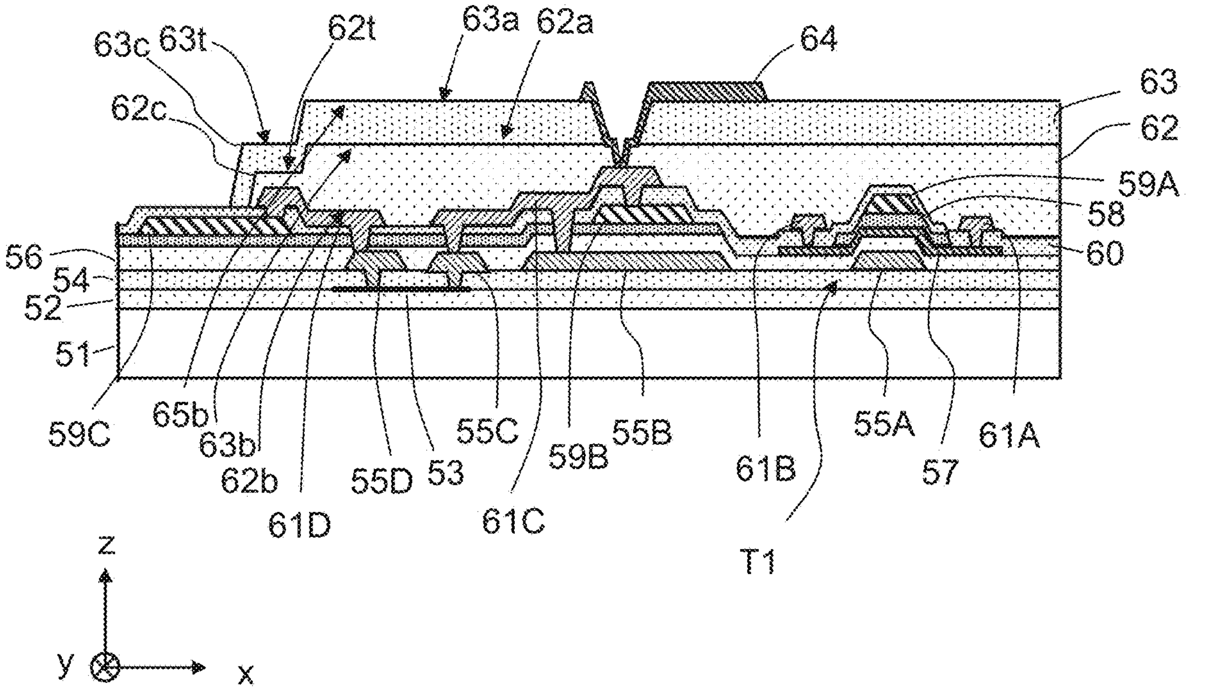
FIG. 15 is a process cross-sectional view illustrating the method for manufacturing the TFT substrate.

Subsequently, the metal film 64' is etched by dry etching or the like using the resist pattern 71 as a mask, thereby forming the wiring layer 64 as shown in FIG. 15.

Figure 16:
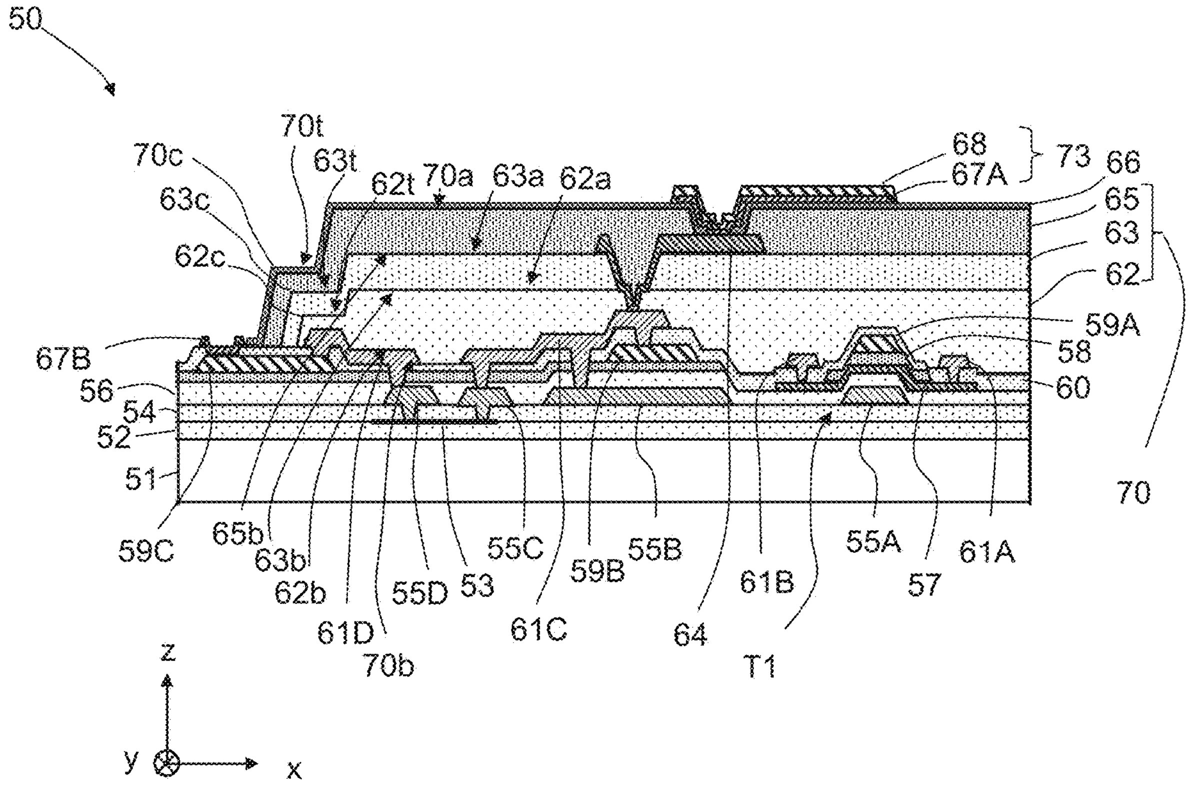
FIG. 16 is a process cross-sectional view illustrating the method for manufacturing the TFT substrate.

As illustrated in FIG. 16, a third planarization layer 65 is formed by applying and patterning an acrylic or polyimide resin to a thickness of 1 μm to 4 μm on the wiring layer 64 and the second planarization layer 63. The third planarization layer 65 can be formed using a photolithography technique similar to that for the first and second planarization layers 62 and 63. On the side face 70*c* of the third planarization layer 65, a terrace 70*t* is formed.

Using a CVD device, a 200 nm thick silicon nitride film is formed on the third planarization layer 65, and a contact hole that exposes a part of the wiring layer 64 is formed on the silicon nitride film, the third planarization layer 65, and the second planarization layer 63, whereby a protective layer 66 is formed. Further, a contact hole is formed in the interlayer insulating layer 60 exposed from the planarization multilayer 70 to expose a part of the wiring layer 59C.

Using a sputtering device, a 125 nm thick indium zinc oxide film is formed in the contact hole as well as on the interlayer insulating layer 60 and the protective layer 66, and is patterned to form the electrode layer 67A and the third terminal 67B. Further, using a sputtering device, a 300 nm thick copper film and a 30 nm thick titanium film are formed on the electrode layer 67A and the protective layer 66, and these films are patterned to form a pad 68. As a result, the TFT substrate 50 provided with the second terminals 73 is completed.

Also, when the electrode layer 67A and the pad 68 that constitute the second terminal 73 are formed, the maximum thickness in the vertical direction (y-axis direction) of the resist film located on the side face 70*c* is reduced by the terrace 70*t* thus formed. Thereby, the electrode layer 67A and the pad 68 can be formed in a correct pattern without any resist remaining on the side face 70*c*.

Figure 17:
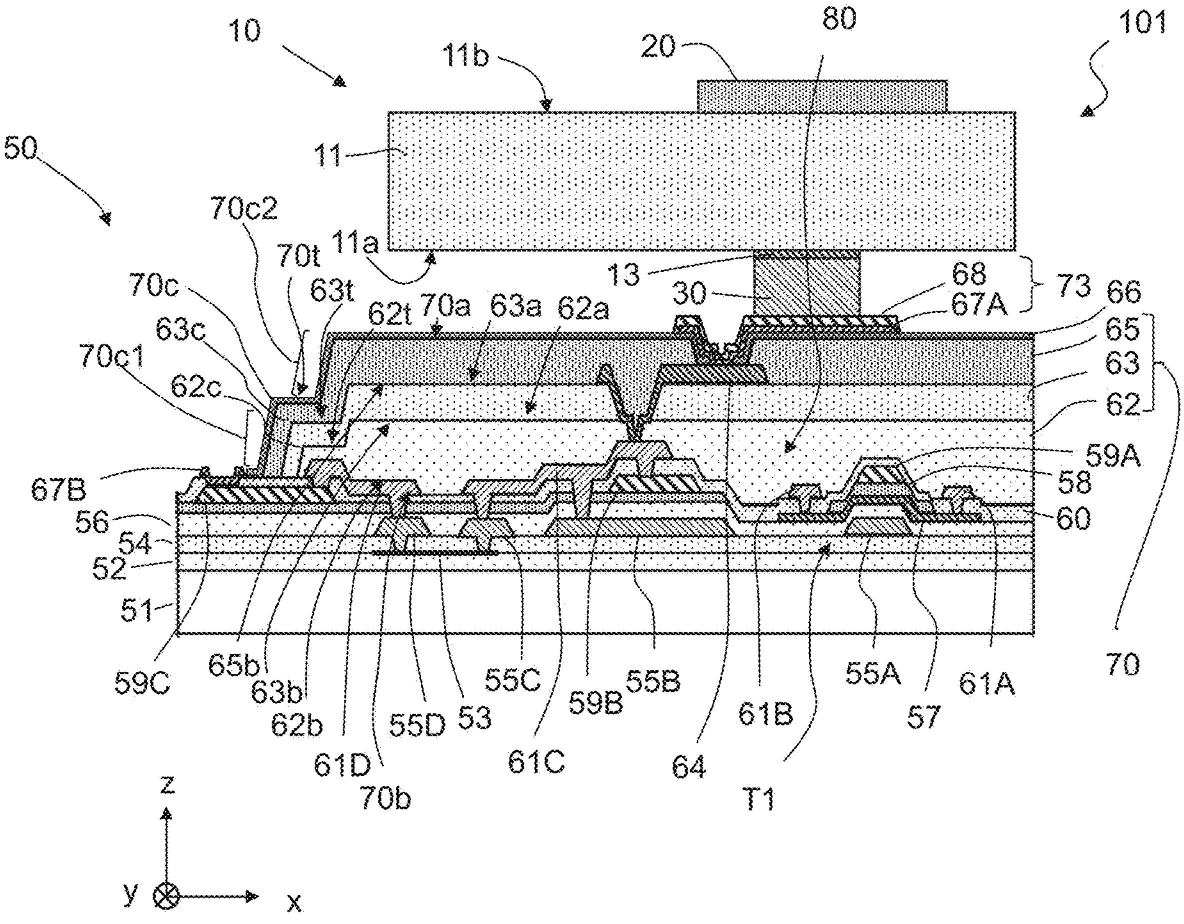
FIG. 17 is a process cross-sectional view illustrating a method for manufacturing the phased array antenna.

As illustrated in FIG. 17, a phased array antenna 101 is completed by bonding the second terminal 73 of the TFT substrate 50 with the first terminal 13 of the printed circuit board 10 via a conductor 30 such as a solder bump.

As described above, according to the present embodiment, even when the planarization multilayer has a large thickness, with a terrace provided on the side face, the resist film for patterning wiring layers to be located inside the planarization multilayer and terminals to be formed on the planarization multilayer is prevented from having a too large thickness in the vertical direction on the side face. Therefore, wiring layers and terminals can be patterned reliably, and manufacturing yields can be increased.

In contrast, if the first planarization layer 62 and the second planarization layer 63 do not have terraces on their side faces, the resist pattern 71 may not be formed correctly, and there is a possibility that wiring layers with correct patterns may not be formed. The reason for this is explained with reference to FIGS. 18 to 21.

Figure 18:
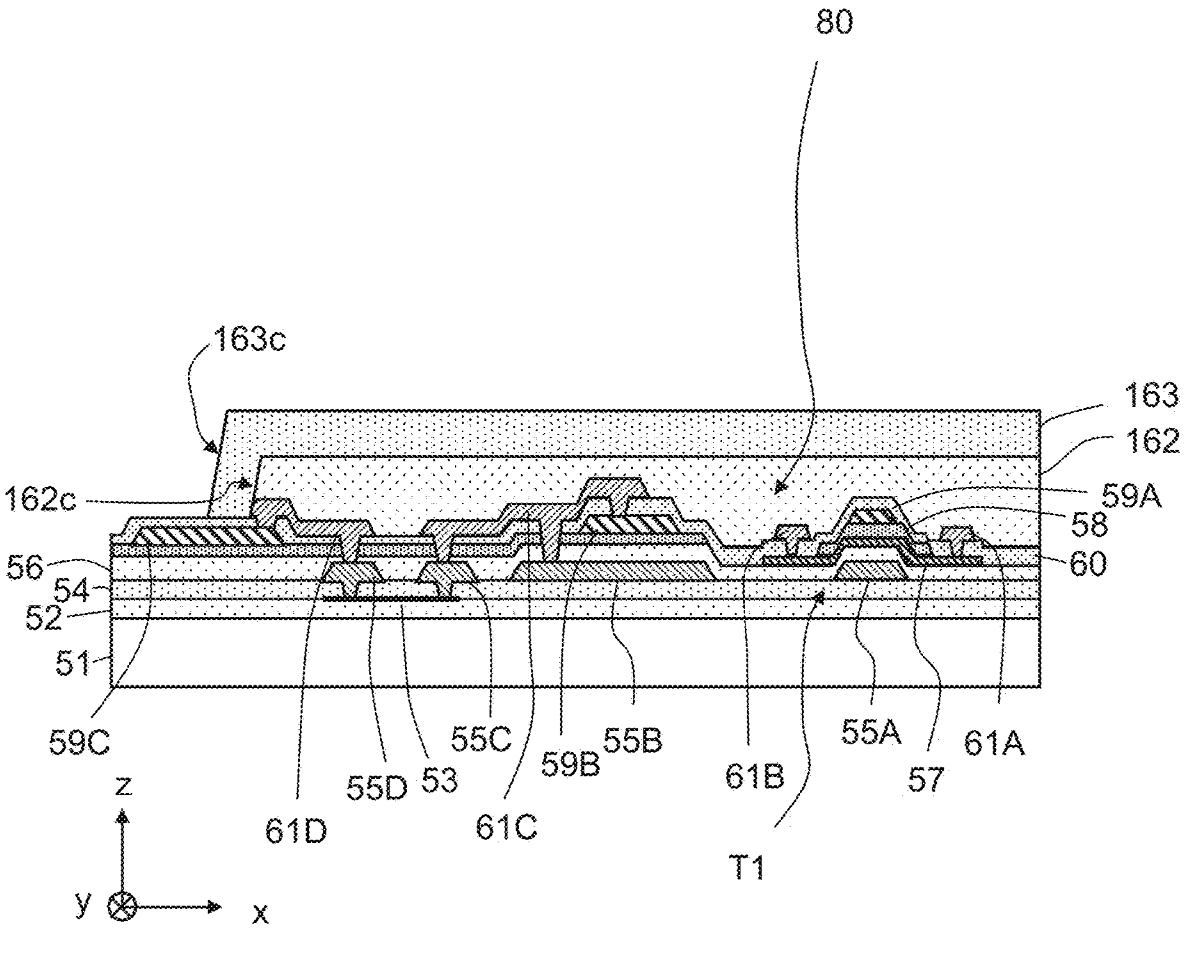
FIG. 18 is a process cross-sectional view for explaining the reason why patterning failures of resist and metal films occur when a planarization multilayer without terraces is used.
Figure 19:
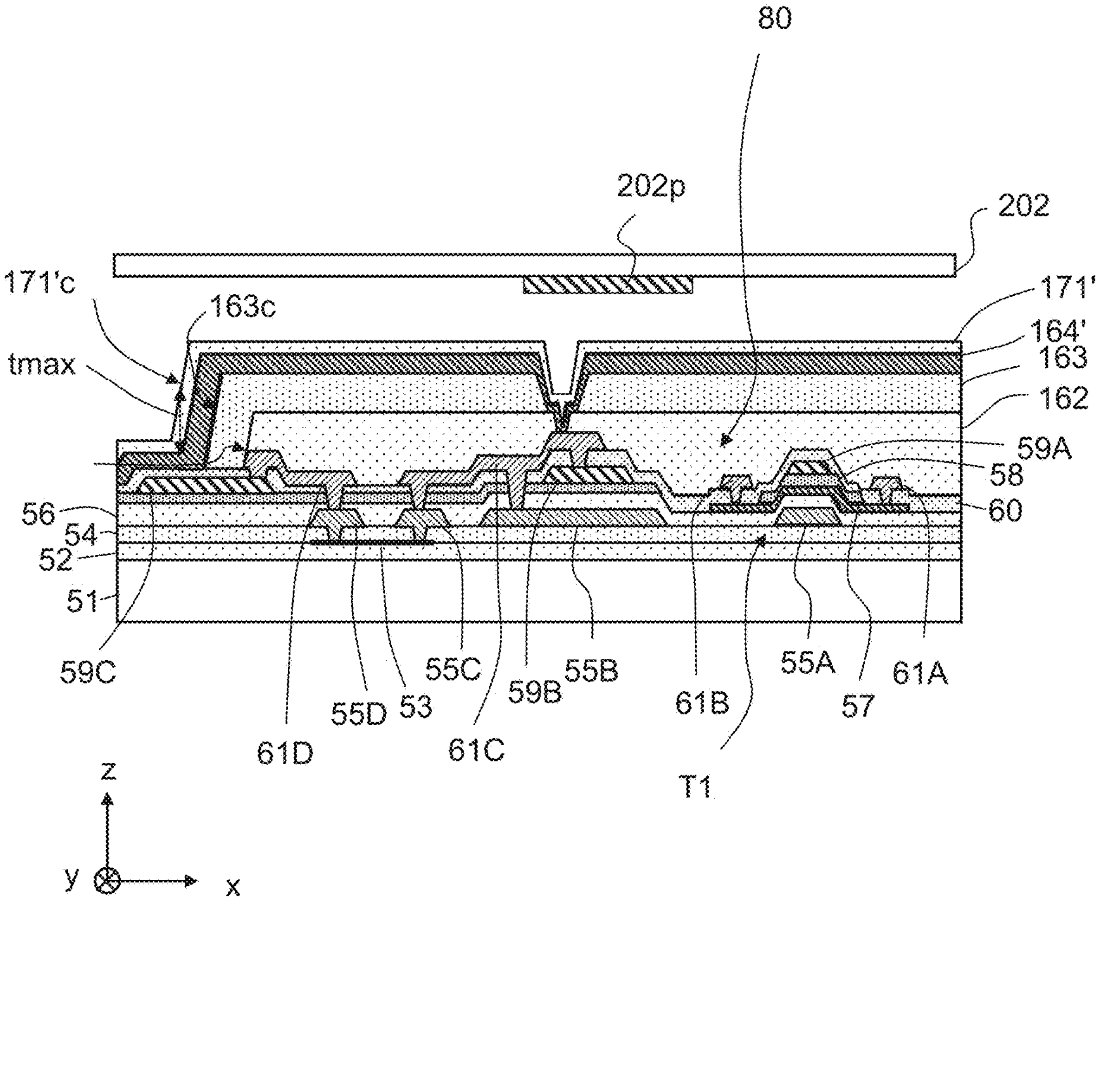
FIG. 19 is a process cross-sectional view for explaining the reason why patterning failures of resist and metal films occur when a planarization multilayer without terraces is used.

As illustrated in FIG. 18, a case is assumed where a first planarization layer 162 does not have a terrace on its side face 162*c*, and a second planarization layer 163 also does not have a terrace on its side face 163*c*. As illustrated in FIG. 19, when a metal film 164' is formed on the second planarization layer 163 and an uncured resist film 171' is further formed, an inclined part 171'*c* of the uncured resist film 171' is formed continuously on the side face 163*c*. Therefore, as illustrated in FIG. 18, the thickness of the inclined part 171'*c* in the vertical direction becomes tmax at maximum.

Figure 20:
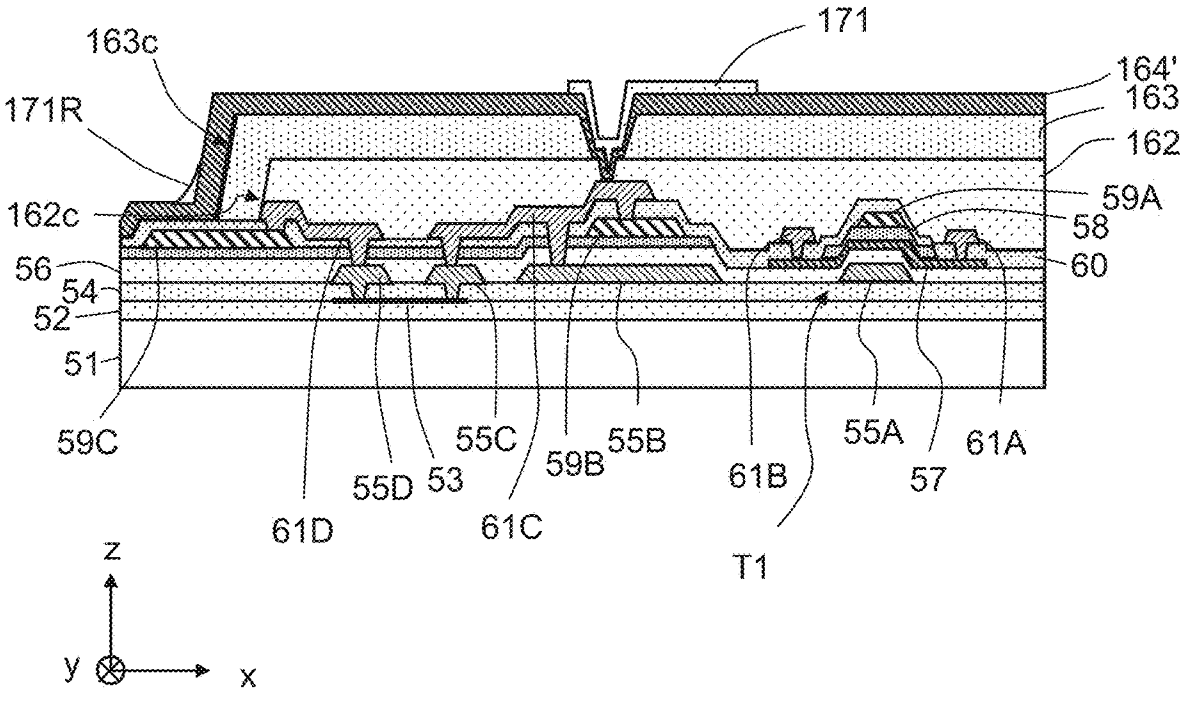
FIG. 20 is a process cross-sectional view for explaining the reason why patterning failures of resist and metal films occur when a planarization multilayer without terraces is used.
Figure 21:
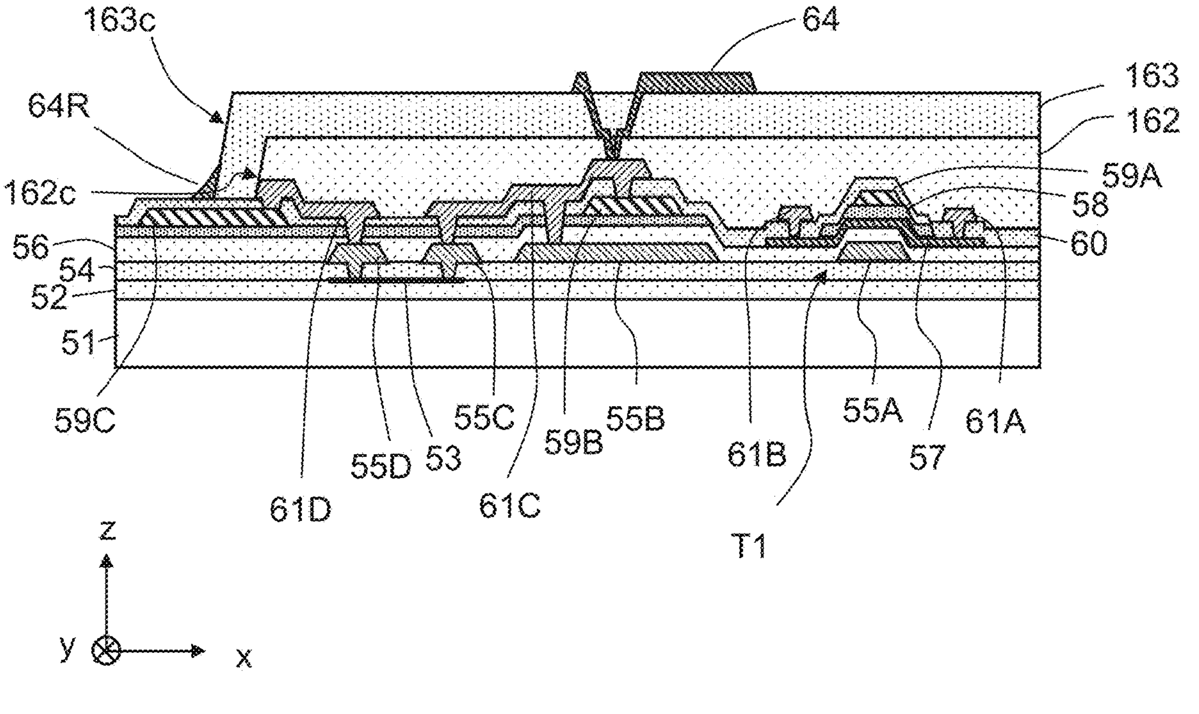
FIG. 21 is a process cross-sectional view for explaining the reason why patterning failures of resist and metal films occur when a planarization multilayer without terraces is used.

When the uncured resist film 171' is exposed using the exposure mask 202 having the pattern 202*p* corresponding to the wiring layer 64, the amount of exposure becomes insufficient in an area where the inclined part 171'*c* has a thickness in the vertical direction of tmax. Therefore, as illustrated in FIG. 20, after development, a resist residual 171R remains, partially covering the side face 163*c* of the second planarization layer 163. Therefore, when the metal film 164' is etched by dry etching using the resist pattern 71 as a mask, the metal film 164' remains also in the area where the residual 171R remains, and as illustrated in FIG. 21, the metal pattern 64R is formed. Since such a TFT substrate is determined to be defective, this causes a decrease in the manufacturing yield of the TFT substrate 50. Since many steps in the manufacturing process of the TFT substrate 50 have been completed before the wiring layer 64 is formed, the occurrence of defects at this point also leads to an increase in manufacturing costs and cycle time. With the configuration of the phased array antenna 101 of the present embodiment, it is possible to solve such manufacturing problems.

Furthermore, in the configuration of the phased array antenna 101 of the present embodiment, since the phases of the transmission/reception signals are controlled by the beamforming ICs 20, the temperature stability is superior to the case where phase control using a dielectric material is used. Furthermore, by forming at least a part of the circuits that control the beamforming ICs 20 on a TFT substrate 50 that is separate from the printed circuit board 10, the scale of the circuits arranged on the printed circuit board 10 can be reduced, areas of the transmission/reception electrodes 12 can be increased, and the number of transmission/reception electrodes can be increased. Therefore, it is possible to improve transmitting/receiving sensitivity and beam control.

Furthermore, in the printed circuit board 10, the transmission/reception electrodes 12 and the beamforming ICs 20 are mounted on different main surfaces, respectively. Therefore, the degree of freedom in arranging the transmission/reception electrodes 12 can be increased, and a sufficient area for arranging the transmission/reception electrodes 12 can be secured. Furthermore, by mounting the transmission/reception electrodes on the first main surface 11*a* facing the TFT substrate 50, the transmission/reception electrodes 12 can be prevented from being exposed to the outside, and the radiation conductors of the transmission/reception electrodes 12 can be protected. Since the beamforming ICs 20 are mounted on the second main surface 11*b*, interference of the beamforming ICs 20 can be avoided when the printed circuit board 10 and the TFT substrate 50 are bonded.

Furthermore, when the control circuits formed on the TFT substrate 50 include TFTs each having an oxide semiconductor layer, leakage current when the TFTs are off can be reduced. Since the TFT channel has high electron mobility, it has excellent response at high frequencies. Furthermore, the TFT has a double gate structure, which enables to reduce leakage current and increase reliability.

Furthermore, when copper is used for the wiring layers of the TFT substrate 50, loss during high frequency control can be reduced. Since the planarization layers are made of an organic material, the dielectric constant can be lowered, and loss between the wiring layers can be reduced. Furthermore, since the dielectric loss tangent is small when the organic material is polyimide, the dielectric loss can be reduced when high frequency signals are transferred.

Further, the TFT substrate 50 can include, for example, a voltage divider circuit for supplying bias voltages to the beamforming ICs 20. This allows the number of circuits formed on the printed circuit board to be reduced and the area of the antenna to be increased. Such voltage divider circuits can be formed using oxide conductors.

Second Embodiment

Figure 22:
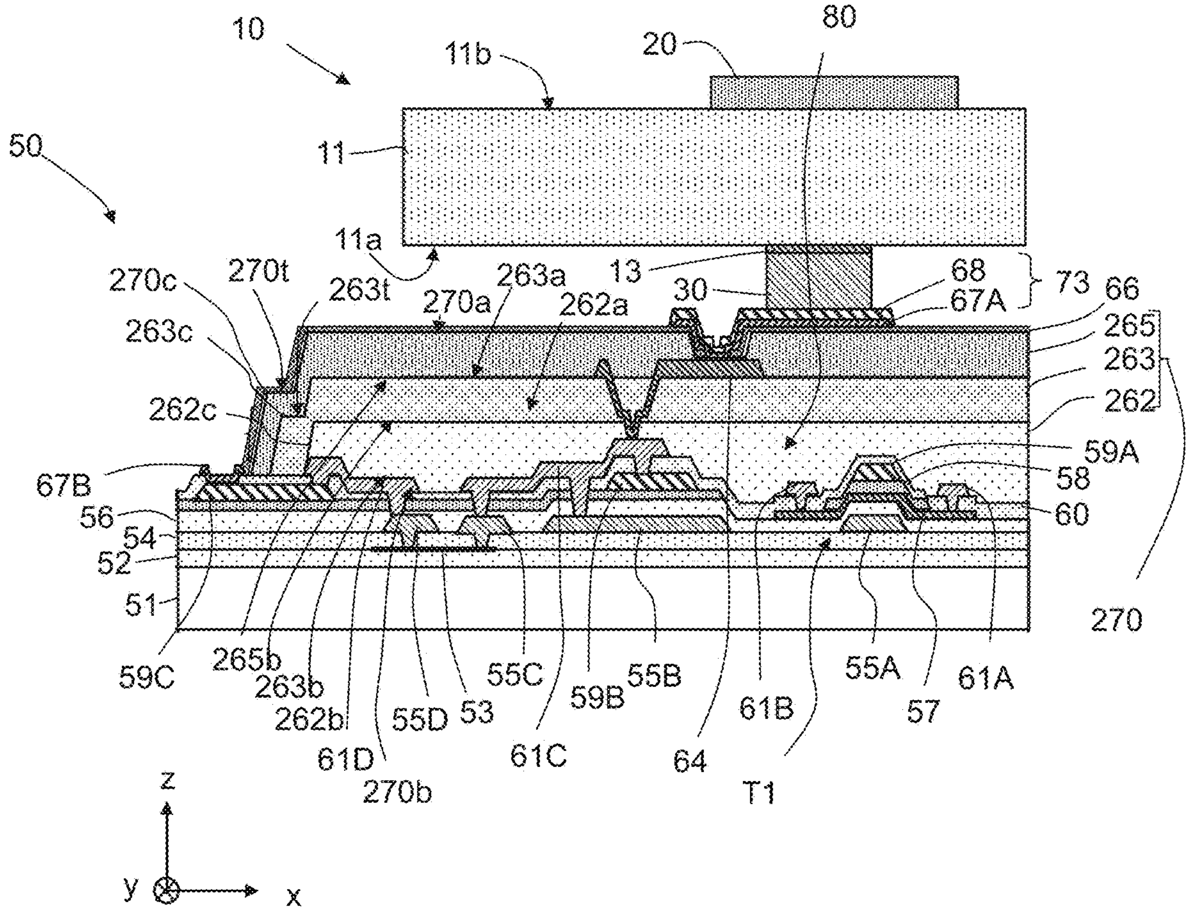
FIG. 22 is a cross-sectional view illustrating an exemplary TFT substrate of a phased array antenna of a second embodiment.

FIG. 22 is a schematic cross-sectional view illustrating a part of an exemplary configuration of a TFT substrate 250 of a phased array antenna of the present embodiment. The TFT substrate 250 includes a planarization multilayer 270 in a form different from that in the first embodiment.

As illustrated in FIG. 22, the planarization multilayer 270 includes a first planarization layer 262, a second planarization layer 263, and a third planarization layer 265. The first planarization layer 262 does not have a terrace on its side face 262*c*. On the other hand, the second planarization layer 263 covers a top face 262*a* and a side face 272*c* of the first planarization layer 262, and has a second terrace 263*t* on the side face 263*c*. The third planarization layer 265 covers a top face 263*a* and a side face 273*c* of the second planarization layer 263, and has a terrace 270*t* on the side face 263*c*.

Since the terrace 263*t* is provided on the side face 263*c* of the second planarization layer 263, unnecessary resist residue does not remain when the wiring layer 64 is formed, as described in the first embodiment. In addition, since the planarization multilayer 270 also has the terrace 270*t* on the side face 270*c*, unnecessary resist residue does not remain when the second terminal 73 is formed.

Therefore, it is possible to manufacture the phased array antenna of the present embodiment, while suppressing a decrease in manufacturing yield, an increase in manufacturing cost, and an increase in cycle time.

Third Embodiment

Figure 23:
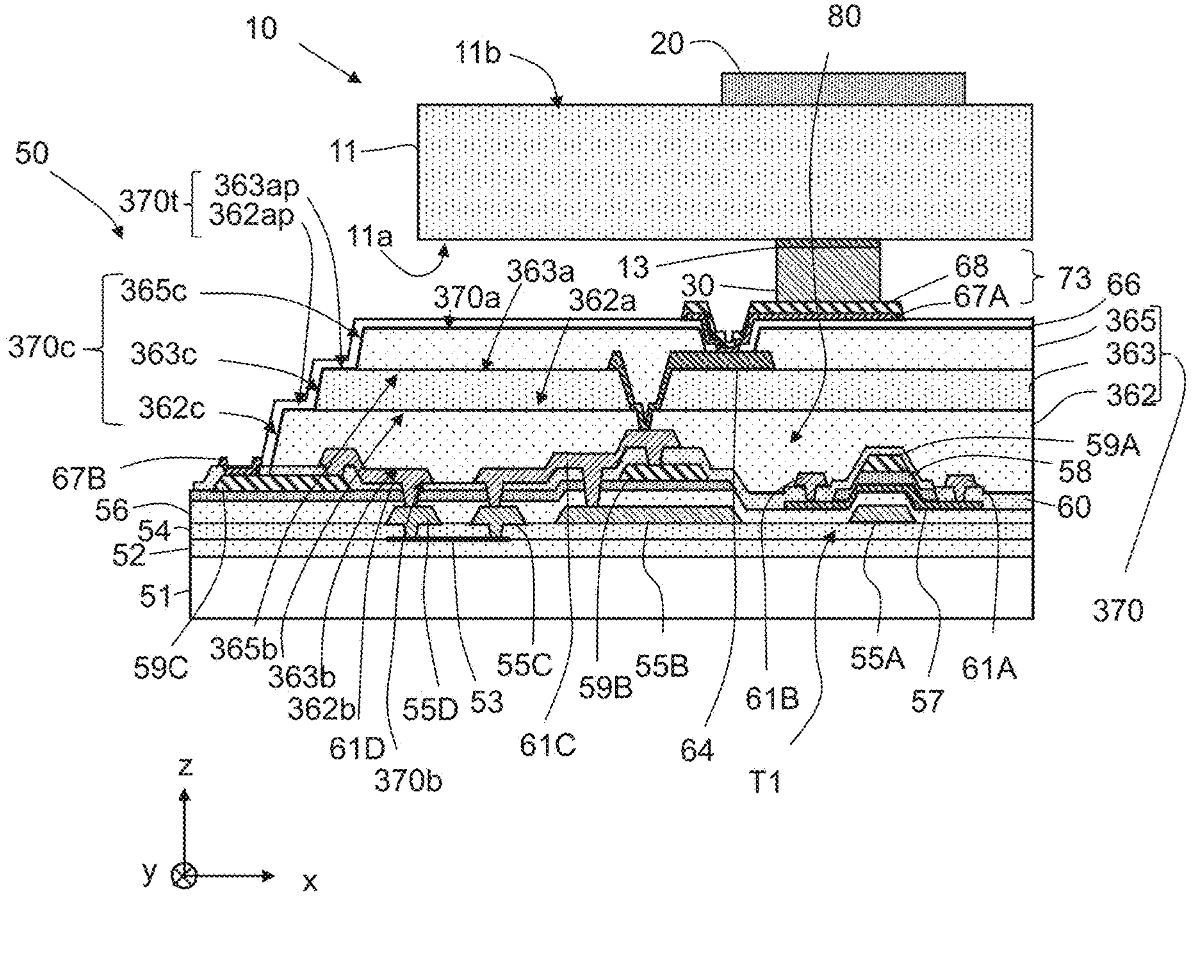
FIG. 23 is a cross-sectional view illustrating an exemplary TFT substrate of a phased array antenna of a third embodiment.

FIG. 23 is a schematic cross-sectional view illustrating a part of an exemplary configuration of a TFT substrate 350 of a phased array antenna of the present embodiment. The TFT substrate 350 includes a planarization multilayer 370 in a form different from that in the first embodiment.

As illustrated in FIG. 23, the planarization multilayer 370 includes a first planarization layer 362, a second planarization layer 363, and a third planarization layer 365. Each planarization layer does not have a terrace on its side face, and a stair-step shape is formed due to the laminate structure of the first planarization layer 362, the second planarization layer 363, and the third planarization layer 365.

Specifically, the first planarization layer 362 has a first top face 362*a*, a first bottom face 362*b*, and a first side face 362*c*. Likewise, the second planarization layer 363 has a second top face 363*a*, a second bottom face 363*b*, and a second side face 363*c*. The third planarization layer 365 has a third top face 365*a*, a third bottom face 365*b*, and a third side face 365*c*.

As is the case with the first embodiment, the first planarization layer 362 is located on the second substrate 51, covering the control circuits 80. The second planarization layer 363 is located on the first top face 362*a* of the first planarization layer 362, exposing a part 362*ap* of the first top face 362*a*. Further, the third planarization layer 365 is located on the second top face 363*a* of the second planarization layer 363, exposing a part 363*ap* of the second top face 363*a*.

Therefore, the part 362*ap* of the first top face 362*a* exposed from the second planarization layer 363 is located between the first side face 362*c* and the second side face 363*c*. Further, the part 363*ap* of the second top face 363*a* exposed from the third planarization layer 365 is located between the second side face 363*c* and the third side face 365*c*.

The first side face 362*c*, the second side face 363*c*, and the third side face 365*c* constitute a side face 370*c* of the planarization multilayer 370, and the part 362*ap* of the first top face 362*a* and the part 363*ap* of the second top face 363*a* respectively constitute terraces 370*t*. In other words, the side face 370*c* includes the first side face 362*c*, the second side face 363*c*, and the third side face 365*c*, and the side face 370*c* is provided with the two terraces 370*t* that include the part 362*ap* of the first top face 362*a* and the part 363*ap* of the second top face 363*a*, respectively.

According to the present embodiment, by laminating a plurality of planarization layers so that outer edge portions of the layers are exposed, the exposed parts can be used as terraces of the planarization multilayer. There is no need to additionally provide terraces on the side face of each planarization layer. Therefore, according to the present embodiment, a planarization multilayer having terraces can be formed without using a multi-tone mask.

Other Embodiments

Various modifications can be made to the phased array antenna of the present disclosure. The arrangements of the transmission/reception electrodes 12 and the beamforming ICs 20 on the printed circuit board 10 shown in the above embodiments are merely examples, and may be arranged in other manners. Further, the radiation conductors of the transmission/reception electrodes 12 may have a shape other than a circle. Furthermore, the TFT substrate 50 may include a control circuit other than the circuit shown in FIG. 5.

Figure 24A:
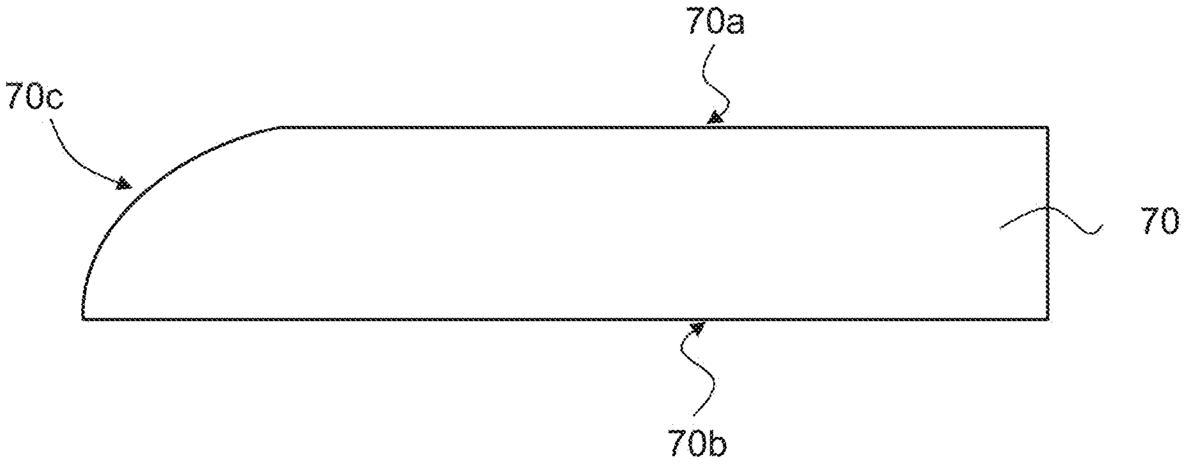
FIG. 24A is a cross-sectional view illustrating another form of a side face of a planarization multilayer.
Figure 24B:
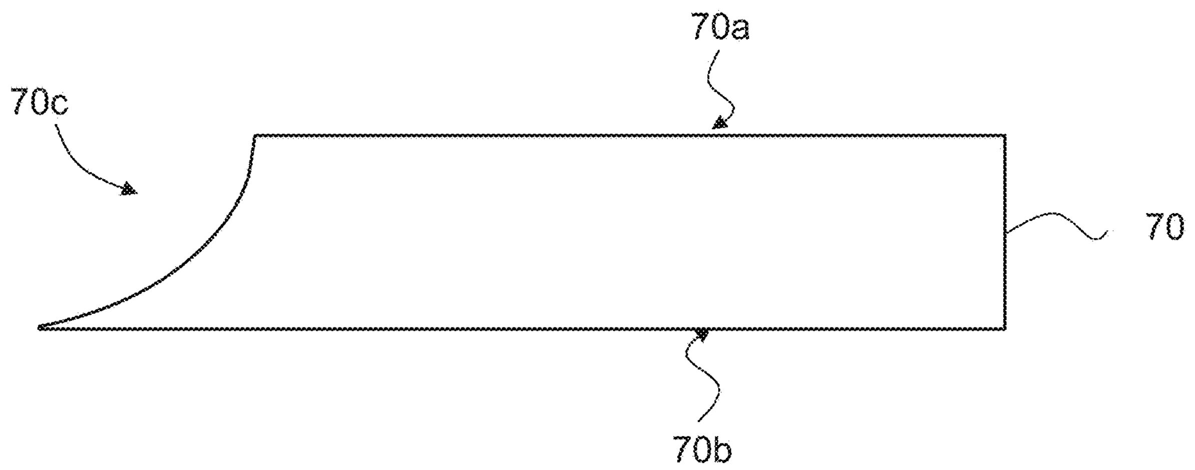
FIG. 24B is a cross-sectional view illustrating another form of a side face of a planarization multilayer.
Figure 24C:
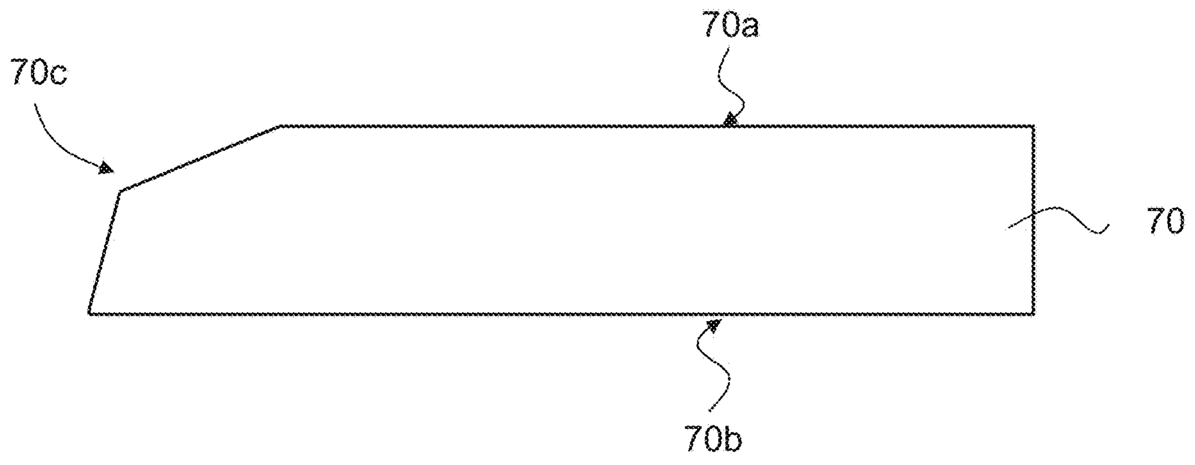
FIG. 24C is a cross-sectional view illustrating another form of a side face of a planarization multilayer.
Figure 24D:
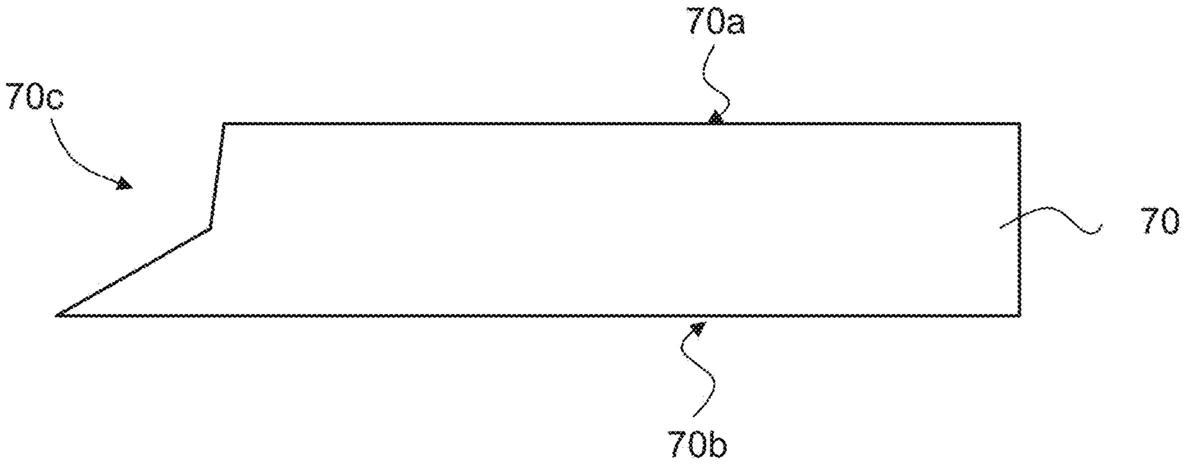
FIG. 24D is a cross-sectional view illustrating another form of a side face of a planarization multilayer.

Furthermore, the shape of the side face of the planarization multilayer is not limited to those in the above embodiments. As described in the above embodiments, when forming the wiring layer 64 disposed within the planarization multilayer or the second terminal disposed on the planarization multilayer, it is sufficient that the side face is shaped such that the thickness in the vertical direction of the resist used for patterning the metal film does not become too large. It is sufficient that the side face 70*c* extended between the end of the top face 70*a* and the end of the bottom face 70*b* of the planarization multilayer 70, in a cross section parallel to the vertical direction, is not formed only by a straight line, but includes a curved line or a broken line. Specifically, as illustrated in FIG. 24A, the side face 70*c* may include a curved surface that is convex to the outer side of the planarization multilayer 70, or as illustrated in FIG. 24B, the side face 70*c* may include a curved surface that is convex to the inner side of the planarization multilayer 70. Further, as illustrated in FIG. 24C, the side face 70*c* may include a broken line that is convex to the outer side of the planarization multilayer 70, or as illustrated in FIG. 24D, the side face 70*c* may include a broken line that is convex to the inner side of the planarization multilayer 70. In this way, even if the side face 70*c* does not include a terrace, it is possible to achieve the effect of suppressing a decrease in yield as described in the first embodiment.

Figure 24E:
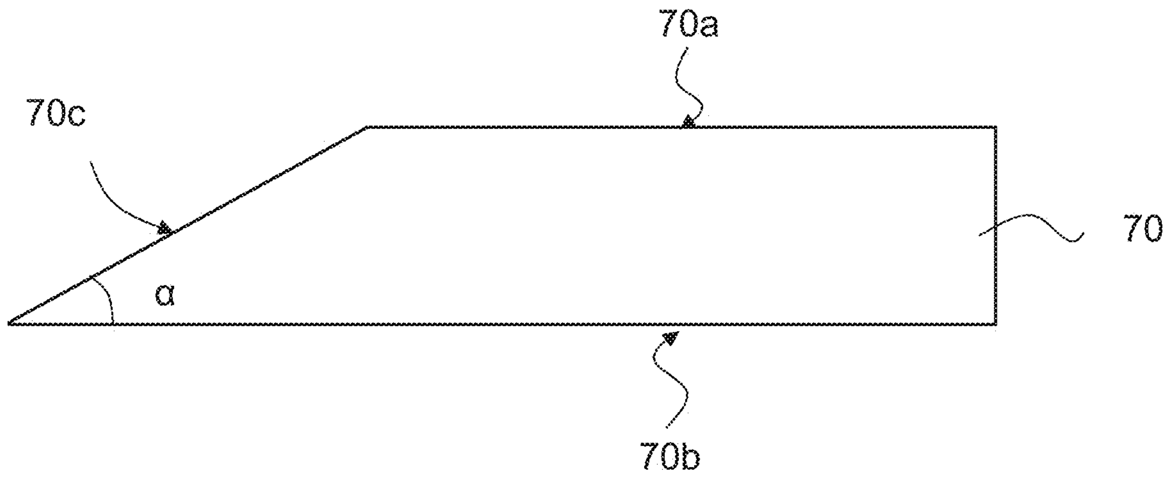
FIG. 24E is a cross-sectional view illustrating an inclination of a side face of a planarization multilayer.

Note that, as illustrated in FIG. 24E, even if the side face 70*c* of the planarization multilayer 70 is formed with only a straight line in a cross section parallel to the vertical direction, if an inclination angle $\alpha$ of the side face with respect to the horizontal direction is small, the resist formed on the side face has a small maximum thickness in the vertical direction. This reduces the possibility that resist residue would remain during photolithography. However, if the inclination angle of the side face 70*c* is small, the area of the side face 70*c* becomes large, and the area of the top face 70*a* of the planarization multilayer 70 becomes relatively small. Therefore, new problems may arise, such as a reduction in the area in which the second terminals are provided. According to the phased array antenna of the present disclosure, for example, when the above-described inclination angle $\alpha$ of the side face is approximately 60° or more, the resist formed on the side face is allowed to have a smaller thickness in the vertical direction, and the area of the side face 70*c* can be prevented from increasing.

The phased array antenna of the present disclosure can also be explained as follows.

A phased array antenna according to a first configuration is a phased array antenna that includes: a printed circuit board including a plurality of first terminals; a TFT substrate including a plurality of second terminals and a plurality of third terminals, the TFT substrate being arranged relative to the printed circuit board in such a manner that the plurality of first terminals and the plurality of second terminals face, respectively; and a plurality of conductors that connect the plurality of first terminals and the plurality of second terminals, respectively. The printed circuit board includes: a first substrate; a plurality of transmission/reception electrodes arranged one-dimensionally or two-dimensionally on the first substrate; and a plurality of beamforming ICs that are arranged on the first substrate and are connected with the plurality of first terminals and the plurality of transmission/reception electrodes. The TFT substrate includes: a second substrate; a plurality of control circuits that are arranged on the second substrate and are connected to the plurality of second terminals and the plurality of third terminals, each control circuit including at least one TFT and generating a control signal that controls one of the plurality of beamforming ICs; and a planarization multilayer arranged on the second substrate in such a manner that the planarization multilayer covers the plurality of control circuits and exposes the plurality of third terminals. The planarization multilayer having a side face and a terrace provided on the side face.

With the first configuration in which the terrace is provided on the side face, photoresist covering the side face when a metal layer for forming the third terminals is patterned is prevented from having a larger thickness continuously in the vertical direction. This makes it unlikely that the resist would remain, and prevents the metal layer from remaining.

A phased array antenna according to a second configuration may have the first configuration further characterized in that: the planarization multilayer includes a first planarization layer having a first side face, and a second planarization layer having a second side face; the first planarization layer is located on the second substrate, covering the plurality of control circuits; and the second planarization layer is located on the first planarization layer, covering the first side face.

A phased array antenna according to a third configuration may have the second configuration further characterized in that: the first planarization layer has a first terrace located on the first side face; and the second planarization layer has a second terrace located on the second side face.

A phased array antenna according to a fourth configuration may have the second configuration further characterized in that: the first planarization layer does not have a terrace on the first side face; and the second planarization layer has a second terrace provided on the second side face.

A phased array antenna according to a fifth configuration may have the third configuration further characterized in that: the planarization multilayer further includes a third planarization layer that is located on the second planarization layer, covering the second side face, and has a third side face; and the terrace of the planarization multilayer is located on the third side face of the third planarization layer.

A phased array antenna according to a sixth configuration may have the fourth configuration further characterized in that: the planarization multilayer further includes a third planarization layer that is located on the second planarization layer, covering the second side face, and has a third side face; and the terrace of the planarization multilayer is located on the third side face of the third planarization layer.

A phased array antenna according to a seventh configuration may have the first configuration further characterized in that: the planarization multilayer includes: a first planarization layer having a first top face, a first bottom face, and a first side face extended between the first top face and the first bottom face; and a second planarization layer having a second top face, a second bottom face, and a second side face extended between the second top face and the second bottom face. The first planarization layer is located on the second substrate, covering the plurality of control circuits; the second planarization layer is located on the first top face in such a manner that the second planarization layer exposes a part of the first top face; the exposed part of the first top face is located between the first side face and the second side face; the side face of the planarization multilayer includes the first side face and the second side face; and the terrace of the planarization multilayer includes the exposed part of the first top face.

A phased array antenna according to an eighth configuration may have the seventh configuration further characterized in that: the planarization multilayer includes a third planarization layer having a third top face, a third bottom face, and a third side face extended between the third top face and the third bottom face. The third planarization layer is located on the second top face in such a manner that the third planarization layer exposes a part of the second top face; the exposed part of the second top face is located between the second side face and the third side face; the side face of the planarization multilayer further includes the third side face; and the planarization multilayer further includes another terrace that includes the exposed part of the second top face.

A phased array antenna according to a ninth configuration may have any one of the fifth, sixth, and eighth configurations further characterized in that: the planarization multilayer further includes a wiring layer that is located between the second planarization layer and the third planarization layer, or between the first planarization layer and the second planarization layer; and the wiring layer is connected to a plurality of the control circuits and the second terminals.

A phased array antenna according to a tenth configuration may have any one of the fifth, sixth, and eighth configurations further characterized in that at least one of the first planarization layer, the second planarization layer, and the third planarization layer has a maximum thickness of 2 μm or more.

A phased array antenna according to an eleventh configuration may have any one of the fifth, sixth, and eighth configurations further characterized in that the first planarization layer, the second planarization layer, and the third planarization layer are made of an organic material.

A phased array antenna according to a twelfth configuration may have the eleventh configuration further characterized in that at least one of the first planarization layer, the second planarization layer, and the third planarization layer is made of polyimide resin.

A phased array antenna according to a thirteenth configuration is a phased array antenna that includes: a printed circuit board including a plurality of first terminals; a TFT substrate including a plurality of second terminals and a plurality of third terminals, the TFT substrate being arranged relative to the printed circuit board in such a manner that the plurality of first terminals and the plurality of second terminals face, respectively; and a plurality of conductors that connect the plurality of first terminals and the plurality of second terminals, respectively. The printed circuit board includes: a first substrate; a plurality of transmission/reception electrodes arranged one-dimensionally or two-dimensionally on the first substrate; and a plurality of beamforming ICs that are arranged on the first substrate and are connected with the plurality of first terminals and the plurality of transmission/reception electrodes. The TFT substrate includes: a second substrate; a plurality of control circuits that are arranged on the second substrate and are connected to the plurality of second terminals and the plurality of third terminals, each control circuit including at least one TFT and generating a control signal that controls one of the plurality of beamforming ICs; and a planarization multilayer arranged on the second substrate in such a manner that the planarization multilayer covers the plurality of control circuits and exposes the third terminals, the planarization multilayer having a top face, a bottom face, and a side face extended between the top face and the bottom face, wherein, in a cross section parallel to the vertical direction, the side face includes a curved line or a broken line.

The present disclosure contains subject matter related to that disclosed in Japanese Priority Patent Application JP 2023-112630 filed in the Japan Patent Office on Jul. 7, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A phased array antenna comprising:

a printed circuit board including a plurality of first terminals;

a TFT substrate including a plurality of second terminals and a plurality of third terminals, the TFT substrate being arranged relative to the printed circuit board in such a manner that the plurality of first terminals and the plurality of second terminals face, respectively; and a plurality of conductors that connect the plurality of first terminals and the plurality of second terminals, respectively, wherein the printed circuit board includes:

a first substrate;

a plurality of transmission/reception electrodes arranged one-dimensionally or two-dimensionally on the first substrate; and a plurality of beamforming ICs that are arranged on the first substrate and are connected with the plurality of first terminals and the plurality of transmission/reception electrodes, and the TFT substrate includes:

a second substrate;

a plurality of control circuits that are arranged on the second substrate and are connected to the plurality of second terminals and the plurality of third terminals, each control circuit including at least one TFT and generating a control signal that controls one of the plurality of beamforming ICs; and a planarization multilayer arranged on the second substrate in such a manner that the planarization multilayer covers the plurality of control circuits and exposes the plurality of third terminals, the planarization multilayer having a side face and a terrace provided on the side face.

2. The phased array antenna according to claim 1, wherein the planarization multilayer includes a first planarization layer having a first side face, and a second planarization layer having a second side face, the first planarization layer is located on the second substrate, covering the plurality of control circuits, and the second planarization layer is located on the first planarization layer, covering the first side face.

3. The phased array antenna according to claim 2, wherein the first planarization layer has a first terrace located on the first side face, and the second planarization layer has a second terrace located on the second side face.

4. The phased array antenna according to claim 2, wherein the first planarization layer does not have a terrace on the first side face, and the second planarization layer has a second terrace provided on the second side face.

5. The phased array antenna according to claim 3, wherein the planarization multilayer further includes a third planarization layer that is located on the second planarization layer, covering the second side face, and has a third side face, and the terrace of the planarization multilayer is located on the third side face of the third planarization layer.

6. The phased array antenna according to claim 4, wherein the planarization multilayer further includes a third planarization layer that is located on the second planarization layer, covering the second side face, and has a third side face, and the terrace of the planarization multilayer is located on the third side face of the third planarization layer.

7. The phased array antenna according to claim 1, wherein the planarization multilayer includes:

a first planarization layer having a first top face, a first bottom face, and a first side face extended between the first top face and the first bottom face; and a second planarization layer having a second top face, a second bottom face, and a second side face extended between the second top face and the second bottom face, wherein the first planarization layer is located on the second substrate, covering the plurality of control circuits, the second planarization layer is located on the first top face in such a manner that the second planarization layer exposes a part of the first top face, the exposed part of the first top face is located between the first side face and the second side face, the side face of the planarization multilayer includes the first side face and the second side face, and the terrace of the planarization multilayer includes the exposed part of the first top face.

8. The phased array antenna according to claim 7, wherein the planarization multilayer further includes a third planarization layer having a third top face, a third bottom face, and a third side face extended between the third top face and the third bottom face, wherein the third planarization layer is located on the second top face in such a manner that the third planarization layer exposes a part of the second top face, the exposed part of the second top face is located between the second side face and the third side face, the side face of the planarization multilayer further includes the third side face, and the planarization multilayer further includes another terrace that includes the exposed part of the second top face.

9. The phased array antenna according to claim 5, wherein the planarization multilayer further includes a wiring layer that is located between the second planarization layer and the third planarization layer, or between the first planarization layer and the second planarization layer, and the wiring layer is connected to the plurality of control circuits and the second terminals.

10. The phased array antenna according to claim 6, wherein the planarization multilayer further includes a wiring layer that is located between the second planarization layer and the third planarization layer, or between the first planarization layer and the second planarization layer, and the wiring layer is connected to the plurality of control circuits and the second terminals.

11. The phased array antenna according to claim 8, wherein the planarization multilayer further includes a wiring layer that is located between the second planarization layer and the third planarization layer, or between the first planarization layer and the second planarization layer, and the wiring layer is connected to the plurality of control circuits and the second terminals.

12. The phased array antenna according to claim 5, wherein at least one of the first planarization layer, the second planarization layer, and the third planarization layer has a maximum thickness of 2 μm or more.

13. The phased array antenna according to claim 6, wherein at least one of the first planarization layer, the second planarization layer, and the third planarization layer has a maximum thickness of 2 μm or more.

14. The phased array antenna according to claim 8, wherein at least one of the first planarization layer, the second planarization layer, and the third planarization layer has a maximum thickness of 2 μm or more.

15. The phased array antenna according to claim 5, wherein the first planarization layer, the second planarization layer, and the third planarization layer are made of an organic material.

16. The phased array antenna according to claim 6, wherein the first planarization layer, the second planarization layer, and the third planarization layer are made of an organic material.

17. The phased array antenna according to claim 8, wherein the first planarization layer, the second planarization layer, and the third planarization layer are made of an organic material.

18. The phased array antenna according to claim 15, wherein at least one of the first planarization layer, the second planarization layer, and the third planarization layer is made of polyimide resin.

19. The phased array antenna according to claim 16, wherein at least one of the first planarization layer, the second planarization layer, and the third planarization layer is made of polyimide resin.

20. A phased array antenna comprising:

a printed circuit board including a plurality of first terminals;

a TFT substrate including a plurality of second terminals and a plurality of third terminals, the TFT substrate being arranged relative to the printed circuit board in such a manner that the plurality of first terminals and the plurality of second terminals face, respectively; and a plurality of conductors that connect the plurality of first terminals and the plurality of second terminals, respectively, wherein the printed circuit board includes:

a first substrate;

a plurality of transmission/reception electrodes arranged one-dimensionally or two-dimensionally on the first substrate; and a plurality of beamforming ICs that are arranged on the first substrate and are connected with the plurality of first terminals and the plurality of transmission/reception electrodes, and the TFT substrate includes:

a second substrate;

a plurality of control circuits that are arranged on the second substrate and are connected to the plurality of second terminals and the plurality of third terminals, each control circuit including at least one TFT and generating a control signal that controls one of the plurality of beamforming ICs; and a planarization multilayer arranged on the second substrate in such a manner that the planarization multilayer covers the plurality of control circuits and exposes the third terminals, the planarization multilayer having a top face, a bottom face, and a side face extended between the top face and the bottom face, wherein, in a cross section parallel to the vertical direction, the side face includes a curved line or a broken line.

* * * * *